(12) United States Patent
Alshin et al.

(10) Patent No.: US 12,047,575 B2
(45) Date of Patent: Jul. 23, 2024

(54) METHODS, APPARATUS, AND ARTICLES OF MANUFACTURE FOR MULTI-SYMBOL EQUIPROBABLE MODE ENTROPY CODING

(71) Applicant: Intel Corporation, Santa Clara, CA (US)

(72) Inventors: Alexander Alshin, Moscow (RU); Jill Boyce, Portland, OR (US); Zhijun Lei, Portland, OR (US); Miroslav Goncharenko, Moscow (RU); Vasily Aristarkhov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 17/539,099

(22) Filed: Nov. 30, 2021

(65) Prior Publication Data

US 2022/0086445 A1    Mar. 17, 2022

Related U.S. Application Data

(60) Provisional application No. 63/121,110, filed on Dec. 3, 2020.

(51) Int. Cl.
| | |
|---|---|
| *H04N 19/13* | (2014.01) |
| *H04N 19/176* | (2014.01) |
| *H04N 19/196* | (2014.01) |
| *H04N 19/91* | (2014.01) |

(52) U.S. Cl.
CPC ........... *H04N 19/13* (2014.11); *H04N 19/176* (2014.11); *H04N 19/196* (2014.11); *H04N 19/91* (2014.11)

(58) Field of Classification Search
CPC ...... H04N 19/13; H04N 19/91; H04N 19/107; H04N 19/70; H03M 7/4018
See application file for complete search history.

(56) References Cited

U.S. PATENT DOCUMENTS

| | | | | |
|---|---|---|---|---|
| 4,122,440 | A |  | 10/1978 | Langdon, Jr. et al. |
| 5,319,457 | A | * | 6/1994 | Nakahashi ........... H04N 19/184 |
| | | | | 375/E7.184 |
| 5,666,161 | A | * | 9/1997 | Kohiyama ........... H04N 19/132 |
| | | | | 375/E7.277 |

(Continued)

OTHER PUBLICATIONS

Han et al., "A Technical Overview of AV1," dated Feb. 8, 2021, arXiv:2008.06091v2, 25 pages.

(Continued)

*Primary Examiner* — Daniel Chang
(74) *Attorney, Agent, or Firm* — HANLEY, FLIGHT & ZIMMERMAN, LLC

(57) ABSTRACT

Methods, apparatus, systems, and articles of manufacture for multi-symbol equiprobable mode entropy coding, An example apparatus includes equiprobabie bypass control circuitry to determine whether an input value associated with the one or more blocks is greater than a reference value. The example apparatus also includes interval control circuitry to, based on the determination, adjust at least one of an upper limit or a lower limit based on an approximate value approximating a product of (1) a quotient of (a) a difference between the alphabet size and one and (b) the alphabet size and (2) the upper limit, the upper limit and the lower limit forming a range of values within which the input value is to be encoded.

21 Claims, 16 Drawing Sheets

(56) References Cited

U.S. PATENT DOCUMENTS

| | | | | |
|---|---|---|---|---|
| 6,115,421 | A * | 9/2000 | Katta | H04N 19/126 375/E7.157 |
| 11,290,720 | B2 * | 3/2022 | Gamei | H04N 19/159 |
| 11,290,751 | B2 * | 3/2022 | Gamei | H04N 19/91 |
| 2004/0047423 | A1 * | 3/2004 | Viscito | H04N 19/115 375/E7.199 |
| 2005/0074176 | A1 * | 4/2005 | Marpe | H04N 19/13 375/E7.138 |
| 2005/0123207 | A1 * | 6/2005 | Marpe | H04N 19/91 375/E7.138 |
| 2005/0156762 | A1 * | 7/2005 | Tsuru | H04N 19/91 341/51 |
| 2006/0251330 | A1 * | 11/2006 | Toth | H04N 19/149 375/E7.113 |
| 2007/0080832 | A1 * | 4/2007 | Yang | H04N 19/109 341/50 |
| 2009/0322573 | A1 * | 12/2009 | Southivong | H04N 19/91 341/51 |
| 2010/0238056 | A1 * | 9/2010 | Seki | H04N 19/149 341/107 |
| 2010/0238998 | A1 * | 9/2010 | Nanbu | H04N 19/176 375/240.03 |
| 2013/0336410 | A1 * | 12/2013 | Nguyen | H04N 19/44 375/E7.027 |
| 2016/0050427 | A1 * | 2/2016 | Berry | H04N 19/42 375/240.01 |
| 2016/0286215 | A1 * | 9/2016 | Gamei | H04N 19/107 |
| 2016/0373788 | A1 * | 12/2016 | Gamei | H04N 19/61 |
| 2017/0033892 | A1 * | 2/2017 | Luby | H04L 1/0066 |
| 2019/0052882 | A1 * | 2/2019 | Barroux | H04N 19/13 |
| 2019/0110079 | A1 * | 4/2019 | Lin | H04N 19/176 |
| 2020/0389660 | A1 * | 12/2020 | Makeev | H04N 19/96 |
| 2021/0211673 | A1 * | 7/2021 | Schwarz | H04N 19/1887 |
| 2022/0217351 | A1 * | 7/2022 | Gamei | H04N 19/107 |

OTHER PUBLICATIONS

Shannon, "A Mathematical Theory of Communication," retrieved Oct. 28, 2021, Mobile Computing and Communications Review, vol. 5, No. 1, 53 pages.
Wikipedia, "Arithmetic coding," retrieved Nov. 9, 2021, found at https://en.wikipedia.org/wiki/Arithmetic_coding, 15 pages.
Wikipedia, "Arithmetic shift," retrieved Nov. 17, 2021, found at https://en.wikipedia.org/wiki/Arithmetic_shift, 6 pages.
Wikipedia, "AV1," retrieved Oct. 27, 2021, found at https://en.wikipedia.org/wiki/AV1, 39 pages.
Wikipedia, "Context-adaptive binary arithmetic coding," retrieved Nov. 17, 2021, found at https://en.wikipedia.org/wiki/Context-adaptive_binary_arithmetic_coding, 5 pages.
Marpe et al., "Context-Based Adaptive Binary Arithmetic Coding in the H.264/AVC Video Compression Standard," revised May 6, 2003, IEEE Transactions on Circuits and Systems for Video Technology, vol. 13, No. 7 (Jul. 2003): 620-636, 17 pages.
Wikipedia, "Entropy Coding," retrieved Oct. 28, 2021, found at https://en.wikipedia.org/wiki/Entropy_coding, 3 pages.
Rissanen, "Generalized Kraft Inequality and Arithmetic Coding," retrieved Oct. 28, 2021, IBM J. Res. Develop., 6 pages.
Wikipedia, "Golomb coding," retrieved Nov. 6, 2021, found at https://en.wikipedia.org/wiki/Golomb_coding, 8 pages.
Huffman, "A Method for the Construction of Minimum-Redundancy Codes," dated Feb. 2006, Resonance, 9 pages.
Wikipedia, "Information theory," retrieved Oct. 27, 2021, found at https://en.wikipedia.org/wiki/Information_theory, 18 pages.
Gallager et al., "Optimal Source Codes for Geometrically Distributed Integer Alphabets," IEEE Transactions of Information Theory, Mar. 1975, 3 pages.
Hartley, "Transmission of Information," retrieved Oct. 28, 2021, Bell System Technical Journal, 29 pages.
Dydychkin, "What is a Video Codec?" dated Feb. 21, 2020, found at https://adydychk.medium.com/what-is-a-video-codec-and-how-does-it-work-6f90bd037fa0, 19 pages.
xiph.org, "Daala video compression," retrieved Oct. 28, 2021, found at https://xiph.org/daala/, 2 pages.

* cited by examiner

US 12,047,575 B2

METHODS, APPARATUS, AND ARTICLES OF MANUFACTURE FOR MULTI-SYMBOL EQUIPROBABLE MODE ENTROPY CODING

RELATED APPLICATION

This patent arises from an application claiming the benefit of U.S. Provisional Patent Application No. 63/121,110, which was filed on Dec. 3, 2020. U.S. Provisional Patent Application No. 63/121,110 is hereby incorporated herein by reference in its entirety. Priority to U.S. Provisional Patent Application No. 63/121,110 is hereby claimed.

FIELD OF THE DISCLOSURE

This disclosure relates generally to entropy coding and, more particularly, to methods, apparatus, and articles of manufacture for multi-symbol equiprobable mode entropy coding.

BACKGROUND

In video compression/decompression (codec) systems, compression efficiency and video quality are important performance criteria. For example, visual quality is an important aspect of the user experience in many video applications. Compression efficiency impacts the amount of memory needed to store video files and/or the amount of bandwidth needed to transmit and/or stream video content. Encoding circuitry of a video codec system typically compresses video information so that more information can be sent over a given bandwidth or stored in a given memory space or the like. The compressed signal or data is then decoded by decoder circuitry of a receiving video codec that decodes or decompresses the signal or data for display to a user. In most examples, higher visual quality with greater compression is desirable.

Figure 1:
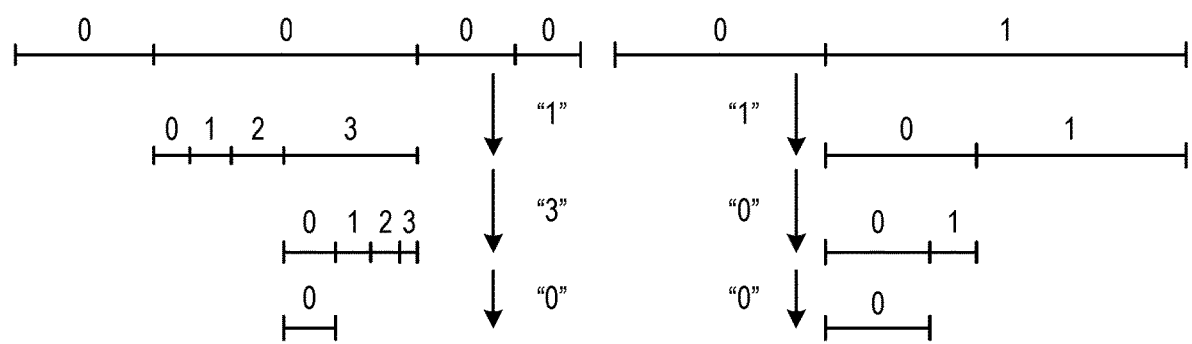
FIG. 1 is an illustration of interval subdivision for multi-symbol entropy coding (left) and for binary symbol coding (right).

In general, the same reference numbers will be used throughout the drawing(s) and accompanying written description to refer to the same or like parts. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "approximate" refer to values that are close to a specified value but not completely accurate or exact. As used herein, "substantially the same" is used to describe two or more values (or items) that are within a threshold difference from one another. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special-purpose electrical circuits structured to perform specific operation(s) and including one or more semiconductor-based logic devices (e.g., electrical hardware implemented by one or more transistors), and/or (ii) one or more general-purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Video coding formats are utilized to represent content for storage and/or transmission. For example, video coding formats are used to store and/or transmit data files and/or bitstreams. Video coding formats include the H.262 format (sometimes referred to as the Moving Picture Experts Group (MPEG)-2 Part 2 format), the MPEG-4 Part 2 format, the H.264 format (sometimes referred to as the MPEG-4 Part 10 format or the Advanced Video Coding (AVC) format), the high efficiency video coding (HEVC) format (sometimes referred to as the H.265 format), the Theora format, the RealVideo RV40 format, the VP9 format, and the AOMedia Video 1 (AV1) format, among others. Video coding formats utilize video compression algorithms that are typically based on discrete cosine transform (DCT) coding and motion compression. Some video coding formats, such as the HEVC format, are adopted by standardization organizations as technical standards for video coding.

Hardware and/or software developers develop video codecs that comply with video coding formats. As used herein, a video codec refers to hardware and/or software developed to perform compression (e.g., encoding) and/or decompression (e.g., decoding) while adhering to one or more video coding formats. In many video coding formats, data (sometimes referred to as symbols) is encoded based on a probability of occurrence of the symbol. Many video coding formats utilize entropy coding to improve coding efficiency.

Entropy coding is used for lossless encoding of symbols in video codecs. When implementing entropy coding, the amount of encoded data decreases on average. Entropy coding was developed based on information theory. One of the foundational formulas of information theory was introduced by Ralph Hartley in 1928. Hartley's proposed equation measured the amount of information contained in a message consisting of K equiprobable symbols. Hartley's equation is illustrated in equation 1.

$$I = K \log_2 N \qquad \text{Equation 1}$$

In equation 1, N represents the number of symbols in the alphabet. For example, if the alphabet is English, the number of symbols corresponds to 26. Alternatively, if the alphabet is binary, the number of symbols corresponds to two, 0 and 1. In 1948, the concept of information entropy, I(x), was introduced by Claude Shannon. Shannon's formula is preferable if an alphabet includes symbols $x_i$ that are not equiprobable and have probabilities $p_i$. Shannon's formula is illustrated in equation 2.

$$I(x) = -\sum_{i=1}^{N} p_i \log_2 p_i \qquad \text{Equation 2}$$

According to the Shannon source coding theorem (e.g., equation 2), N random variables, each with entropy I(x), cannot be compressed into less than N*I(x) bits without risk of losing information as N approaches infinity. In 1952, Huffman codes were proposed. Huffman codes approach the Shannon limit for specific probabilities. In 1976, arithmetic coding based on sequential interval division entropy coding algorithms was proposed. Arithmetic coding based on sequential interval division entropy coding algorithms approaches the Shannon limit more consistently than previous techniques. The efficiency of modern entropy codecs is close to the Shannon limit, but further improvement is possible. For example, modern codecs may be improved via the construction of a high-precision estimation of probability with adaptation.

Additionally, modern codecs encode large amounts of different data. To accomplish this task, modern codecs utilize dependencies on the context of previously encoded symbols. Modern codecs substitute the probability for conditional probability. For example, the data that is to be coded is distributed according to context models. Context models are probability models for a symbol and may be selected by a video codec based on statistics of recently coded symbols. Probabilities are evaluated within each context model independently.

An example of context-based coding is context-adaptive binary arithmetic coding (CABAC). CABAC is used for the HEVC and H.264 (main profile) video coding formats. The Versatile Video Coding (VVC) format utilizes an entropy coding technique that is similar to CABAC for HEVC, except that probability estimations are performed differently.

The VVC format introduces a new engine that is designed to be more flexible and efficient. For example, 393 context models correspond to 78 different types of data. In the VVC format, the number of context models is approximately twice that of the HEVC format.

By utilizing non-binary entropy coding, modern codecs can encode symbols from an alphabet which consists of N elements, where N is greater than two. During HEVC standardization, some aspects of non-binary arithmetic coding were attempted, but not adopted (e.g., proposals to the Joint Collaborative Team on Video Coding (JCT-VC)). However, non-binary arithmetic coding has been utilized in Daala video coding format and the AV1 format.

The AV1 format is an open, royalty-free, video coding format. AV1 was designed to support video transmission over the Internet. The AV1 specification includes a reference video codec (e.g., hardware and/or software). AV1 achieves higher data compression than the VP9, H.264 (high profile), and H.264 (main profile) video coding formats. AV1 has also been adopted for image file formatting. For example, the AV1 Image File Format (AVIF) uses AV1 compression algorithms.

Unlike most other popular video coding formats that support binary arithmetic coding, the AV1 format uses multi-symbol arithmetic coding. For this reason, the AV1 format is referred to as a multi-symbol entropy coding format. In the AV1 format, each element of syntax belongs to an alphabet of N elements. In the AV1 format, the size of the alphabet, N, is less than or equal to sixteen. In the AV1 format, each context includes N probabilities and a counter that tracks updates to the probability. The most common context models in AV1 utilize transform coefficients with four-bit values. For probability estimation, the AV1 format calls for an exponential smoothing technique. The exponential smoothing technique can be expressed in a recursive form according to equation 3.

$$p(t+1) = \alpha * x(t) + (1-\alpha) * p(t) \quad \text{Equation 3}$$

In equation 3, $x(t)$ is equal to one when an event has occurred and zero if not. To simplify implementation and avoid multiplications, the set of possible values for a is limited to negative integer powers of two. The simplified equation is illustrated in equation 4.

$$P(t+1) = x(t) * (32{,}768 >> \beta) + P(t) - (P(t) >> \beta) \quad \text{Equation 4}$$

In equation 4, $P(t)$ is a fixed-point representation of probability $p(t)$ represented using fifteen bits. The parameter $\beta$ depends on the number of updates to the probability and the size of the alphabet. Small $\beta$ values correspond to fast adaptation to optimal probabilities. However, after convergence to optimal probability, probability estimation with small $\beta$ values has a smaller variance of prediction. Thus, starting with relatively small values, AV1 codecs gradually increase the $\beta$ value with the number of updates. The $>>$ operator represents a right shift of the term to the left of the operator by a number of bits equal to the term to the right of the operator. For example, the expression $32{,}768 >>$ represents the operation of right shifting 32,768 by $\beta$ bits.

According to the AV1 format, AV1 codecs utilize cumulative distribution functions (CDFs). CDFs include an array of N elements, cdf[i], where every element represents the probability of an event, val>i (e.g., value greater than i). For a current symbol, val, that is to be encoded, the update of cdf[i] follows pseudocode 1 below.

```
    if i < val
cdf[i] = cdf[i] + ((32,768- cdf[i]) >> β)
        else
    cdf[i] = cdf[i] - (cdf[i]) >> β).
    Pseudocode 1
```

In pseudocode 1, the term cdf[N−1] is set to zero so that N−1 updates of the CDF are performed plus an additional update for the counter. The increased alphabet size of the AV1 format provides additional efficiency gain in terms of bit saving. While the number of calculations in the multi-symbol case is significantly higher compared to a binary-symbol coding format, multi-symbol coding can be executed in parallel. In the worst-case scenario for the AV1 format (N=16), to encode one symbol, AV1 codecs update 15 cumulative probabilities (e.g., CDFs) where each cumulative probability is represented by fifteen-bits. Also included is an index that represents the total number of updates. Table 1 represents a comparison of the number of updates and the memory consumption between the worst-case scenario in AV1 (N=16), HEVC (N=4), and VVC (N=8).

TABLE 1

|  | AV1 | HEVC | VVC |
| --- | --- | --- | --- |
| Number of updates | 15 + 1 | 4 | 8 |
| Memory Consumption | 230 bits | 28 bits | 12 bytes = 96 bits |

Interval subdivision for multi-symbol entropy coding has presented new challenges that are not present in binary arithmetic coding. For example, these challenges are present in multi-symbol due to the performance of multi-symbol interval subdivision using integer arithmetic. FIG. 1 illustrates interval subdivision for multi-symbol entropy coding (left) and for binary-symbol coding (right).

As illustrated in FIG. 1, the increase of alphabet size corresponds to a decrease of probability for each symbol. For improved efficiency, interval subdivision should approach $p_i$*Range. If $p_i$ approaches zero, the number of bits representing range should be increased. Table 2 illustrates the range for the AV1 format, the HEVC format, and the VVC format.

TABLE 2

|  | AV1 | HEVC | VVC |
| --- | --- | --- | --- |
| Range | 32768-65535 |  | 256-511 |

Another challenge is the possibility that after division, the range for a symbol may approach zero which prohibits performance of later operations in multi-symbol AV1 codecs. To avoid this situation, AV1 codecs ensure that the range for a symbol will not be less than four according to pseudocode 2 below.

```
u = ((r >> 8) *(fl >> 6) >> 1 + 4 * (N - (s - 1));
v = ((r >> 8) * (fh >> 6) >> (1)) + 4 * (N - (s + 0));
    r = u - v
    Pseudocode 2
```

In pseudocode 2, the variable r represents the range for a symbol. In pseudocode 2, the terms fl and fh represent cumulative probabilities (e.g., CDFs). Another challenge for the AV1 format is equiprobable coding. For example, the HEVC, VVC, and AVC video coding formats implement CABAC, but no similar equiprobable coding technique exists for the AV1 format. For example, CABAC includes a bypass mode that allows a corresponding codec to bypass the arithmetic coding process. The bypass mode of CABAC is used to encode and/or decode transform coefficients, motion vector differences, etc. While non-binary arithmetic encoding has been attempted with CABAC, under those attempts, the bypass mode can only be applied for N-symbol equiprobable mode if N equals a multiple of two (e.g., N=4, 8, 16, etc.). However, CABAC has only been applied to binary entropy coding or entropy coding with multiples of two.

Huffman codes and Rice-Golomb codes are other techniques to compress data. Golomb codes were first designed by Solomon Golomb in the 1960s. Golomb proposed that an integer x, greater than or equal to zero (e.g., x≥0), can be represented as illustrated in equation 5 below.

$$x = q * M + r \qquad \text{Equation 5}$$

In equation 5, M corresponds to a Golomb-Rice parameter, q corresponds to a codeword that is equal to the rounded down value of the integer, x, divided by the Golomb-Rice parameter, M $$\left(\text{e.g., } q = \left\lfloor \frac{x}{M} \right\rfloor\right),$$

and r corresponds to the remainder of dividing the integer, x, by the Golomb-Rice parameter, M. The codeword, q, should be encoded as unary code and the remainder, r, is encoded via truncated binary encoding. Generally, the remainder, r, is transformed via a DCT. After the transform, the result is a transform coefficient. As such, when encoding the codeword and the remainder, the number of bits depends on the remainder. If the transform coefficient is a relatively small value, context models may be used to approximate codes. If the transform coefficient is a relatively large value, Rice codes may be used. Typical Rice-Golomb codes are only efficient if q is a power of two (e.g., $q=2^l$).

TABLE 3

| x | r, M = 4 | r, M = 5 | r, M = 6 | r, M = 7 |
|---|---|---|---|---|
| 0 | 00 | 00 | 00 | 00 |
| 1 | 01 | 01 | 01 | 010 |
| 2 | 10 | 10 | 100 | 011 |
| 3 | 11 | 110 | 101 | 100 |
| 4 | 00 | 111 | 110 | 101 |
| 5 | 01 | 00 | 111 | 110 |
| 6 | 10 | 01 | 00 | 111 |
| 7 | 11 | 10 | 01 | 00 |

Table 3 represents remainder values for Golomb-Rice parameters 4, 5, 6, and 7 according to typical Rice-Golomb code generation. In Table 3, the number of bits of the remainder is always equal to the value of 1, or the power of two to which q is equal. In codecs that comply with the VVC and HEVC formats, Rice codes are widely used for transform coefficient coding. Table 4 represents the binarization of transform coefficients in VVC.

TABLE 4

| Abs(q) | Sig | gt1 | par | gt3 | rem |
|---|---|---|---|---|---|
| 0 | 0 | — | — | — | — |
| 1 | 1 | 0 | — | — | — |
| 2 | 1 | 1 | 0 | 0 | — |
| 3 | 1 | 1 | 1 | 0 | — |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |

In VVC, because parity is also encoded at the initial stage, instead of coding x=q−4, the only value the VVC codec encodes is r=(x−4)>>1. For values of x that have a geometric distribution, the probability that x equals k can be represented as illustrated in equation 6. The value r=x>>1 has a geometric distribution as illustrated in equation 7.

$$Pr(X = k) = (1 - p)^k p = q^k p, k = 0, 1, 2, \ldots \qquad \text{Equation 6}$$

$$Pr(Rem = k) = q_1^k p_1 \text{ where } q_1 = (1 - p)^2 \qquad \text{Equation 7}$$

In some examples, Golomb-Rice parameters can be derived according to the equation 8 that was first proposed in the mid-1970s. For high bit depth and low quantization parameter (Qp), p is close to zero. In such examples, the formula for Golomb-Rice parameters can be simplified using the equations 9 and 10, where the equation 9 is used for small p values. Equation 11 illustrates a simplified formula for Golomb-Rice parameters in such examples. For classical Rice codes, in equation 11, $n=2^l$ where n is limited to a subset of integer values (e.g., not any integer value).

$$\frac{1}{2} = q^n = (1 - p)^n \qquad \text{Equation 8}$$

$$\ln(1 - p) = -p - \frac{p^2}{2} \qquad \text{Equation 9}$$

$$E(X) + 1 = \frac{1}{p} \qquad \text{Equation 10}$$

$$(\ln(2)) * (E(X) + 1/2) = n. \qquad \text{Equation 11}$$

Unlike CABAC, Huffman codes, Rice-Golomb codes, and other techniques described above, examples disclosed herein are valid for all integer values. For example, when implementing examples disclosed herein, alphabet sizes are not limited to powers of two and includes an integer value (e.g., any integer value). Examples disclosed herein enable the use of a bypass mode for N-symbol entropy coding where N can be any integer value (e.g., N=3, 4, 5, 6, 7, 8, 9, 10, etc.). Entropy decoding can be a bottleneck during decoding in video codecs, especially at high bit-rate operating points. However, examples disclosed herein reduce entropy decoding complexity and enable higher performance decoding without a significant impact on coding efficiency. Examples disclosed herein increase coding efficiency for video codecs. Additionally, examples disclosed herein can be applied to any video coding format that utilizes Rice and/or Golomb codes.

Examples disclosed herein process overhead reading to increase throughput and reduce complexity and memory usage when implementing multi-symbol entropy coding. Examples disclosed herein facilitate a bypass mode for multi-symbol entropy coding. Example methods, apparatus, and articles of manufacture disclosed herein may be applied in many circumstances of multi-symbol entropy coding. For example, arithmetic coding in multi-symbol entropy coding may be bypassed for the computationally less complex and faster multi-symbol equiprobable mode disclosed herein if the number of updates inside a context model is below a threshold. Arithmetic coding in multi-symbol entropy coding may be bypassed for the computationally less complex and faster multi-symbol equiprobable mode disclosed herein if a-priori known probabilities are limited to 1/N. Arithmetic coding in multi-symbol entropy coding may be bypassed for the computationally less complex and faster multi-symbol equiprobable mode disclosed herein for encoding and/or decoding transform coefficients. Arithmetic coding in multi-symbol entropy coding may be bypassed for the computationally less complex and faster multi-symbol equiprobable mode disclosed herein to eliminate a restriction on alphabet size (e.g., sometimes referred to as dictionary size).

Figure 2:
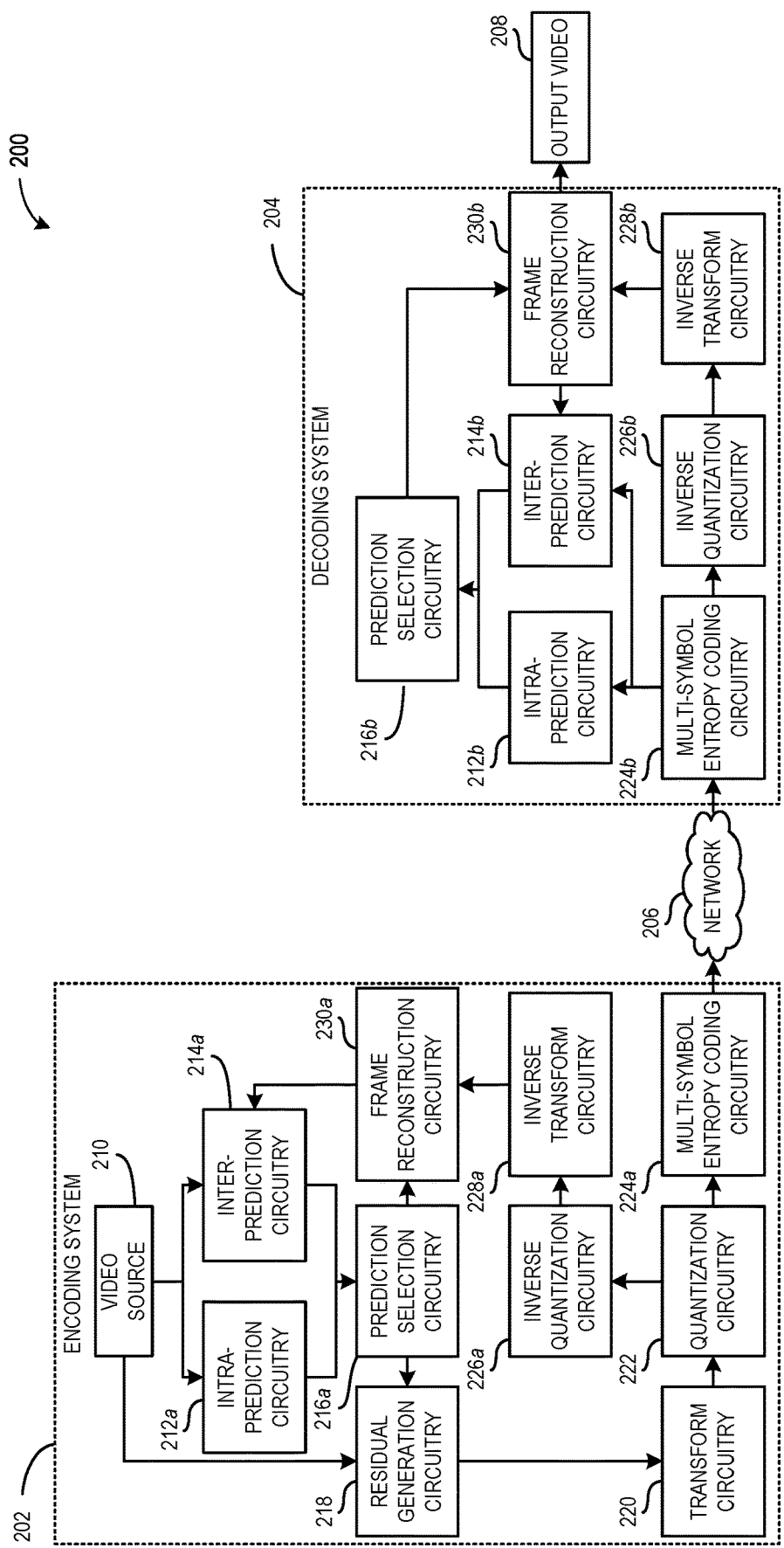
FIG. 2 is an example environment for encoding and/or decoding video in accordance with examples disclosed herein.

FIG. 2 is an example environment 200 for encoding and/or decoding video in accordance with examples disclosed herein. The environment 200 includes an example encoding system 202 in communication with an example decoding system 204 via an example network 206. In the example of FIG. 2, video data encoded by the encoding system 202 is decoded by the decoding system 204 to generate example output video 208. In the example of FIG. 2, the encoding system 202 and the decoding system 204 operate according to the AV1 format. However, in additional or alternative examples, one or more of the encoding system 202 or the decoding system 204 operate according to one or more different video coding formats.

In the illustrated example of FIG. 2, the example encoding system 202 includes an example video source 210, example first intra-prediction circuitry 212a, example first inter-prediction circuitry 214a, example first prediction selection circuitry 216a, example residual generation circuitry 218, example transform circuitry 220, example quantization circuitry 222, example first multi-symbol entropy coding circuitry 224a, example first inverse quantization circuitry 226a, example first inverse transform circuitry 228a, and example first frame reconstruction circuitry 230a. In the example of FIG. 2, the video source 210 may be implemented by a camera (e.g., a consumer camera, a medical imaging camera, etc.), an uncompressed video file, or the like. In some examples, the video source 210 may be implemented by interface circuitry that obtains video data from a camera. The example video source 210 is coupled to the first intra-prediction circuitry 212a, the first inter-prediction circuitry 214a, and the residual generation circuitry 218. In the example of FIG. 2, the video source 210 provides video on a per-frame basis where each frame is divided into one or more blocks (e.g., superblocks and/or smaller blocks).

In the illustrated example of FIG. 2, the first intra-prediction circuitry 212a is implemented by processor circuitry such as one or more special-purpose electrical circuits structured to perform specific operation(s) and including one or more semiconductor-based logic devices (e.g., electrical hardware implemented by one or more transistors). In the example of FIG. 2, the first intra-prediction circuitry 212a is coupled to the video source 210 and the first prediction selection circuitry 216a. In the example of FIG. 2, the first intra-prediction circuitry 212a receives a block in the current frame of video being processed and searches for another block within the current frame that can be copied or that is the same or substantially the same as the current block. The first intra-prediction circuitry 212a may implement equation 3 and/or equation 4 described above to perform exponential smoothing of predictions. After determining a block from within the current frame that can be copied (e.g., an intra-prediction), the first intra-prediction circuitry 212a sends the block to the first prediction selection circuitry 216a.

In the illustrated example of FIG. 2, the first inter-prediction circuitry 214a is implemented by processor circuitry such as one or more special-purpose electrical circuits structured to perform specific operation(s) and including one or more semiconductor-based logic devices (e.g., electrical hardware implemented by one or more transistors). In some examples, the first inter-prediction circuitry 214a is referred to as motion estimation circuitry. In the example of FIG. 2, the first inter-prediction circuitry 214a is coupled to the video source 210, the first prediction selection circuitry 216a, and the first frame reconstruction circuitry 230a. In the example of FIG. 2, the first inter-prediction circuitry 214a receives a block in the current frame of video being processed and searches for another block in another frame or other frames that can be copied or that is the same or substantially the same as the current block. After determining a block from another frame or other frames that can be copied (e.g., an inter-prediction), the first inter-prediction circuitry 214a sends the block to the first prediction selection circuitry 216a.

In the illustrated example of FIG. 2, the first prediction selection circuitry 216a is implemented by processor circuitry such as one or more special-purpose electrical circuits structured to perform specific operation(s) and including one or more semiconductor-based logic devices (e.g., electrical hardware implemented by one or more transistors). In the example of FIG. 2, the first prediction selection circuitry 216a is coupled to the first intra-prediction circuitry 212a, the first inter-prediction circuitry 214a, the residual generation circuitry 218, and the first frame reconstruction circuitry 230a. In the example of FIG. 2, the first prediction selection circuitry 216a receives the block predicted by the first intra-prediction circuitry 212a (e.g., an intra-prediction) and the block predicted by the first inter-prediction circuitry 214a (e.g., an inter-prediction). The first prediction selection circuitry 216a selects one of the intra-prediction block or the inter-prediction block based on one or more profit criteria (e.g., based on the amount of bytes required to encode the blocks, based on the quality of the blocks, etc.).

In the illustrated example of FIG. 2, the residual generation circuitry 218 is implemented by processor circuitry such as one or more special-purpose electrical circuits structured to perform specific operation(s) and including one or more semiconductor-based logic devices (e.g., electrical hardware implemented by one or more transistors). In the example of FIG. 2, the residual generation circuitry 218 is coupled to the video source 210, the first prediction selection circuitry 216a, and the transform circuitry 220. In the example of FIG. 2, the residual generation circuitry 218 generates a residual based on the current block in the current frame of video being processed and the predicted block selected by the first prediction selection circuitry 216a. For example, the residual generation circuitry 218 determines the differences between (a) the current block in the current frame of video being processed and (b) the predicted block selected by the first prediction selection circuitry 216a.

In the illustrated example of FIG. 2, the transform circuitry 220 is implemented by processor circuitry such as one or more special-purpose electrical circuits structured to perform specific operation(s) and including one or more semiconductor-based logic devices (e.g., electrical hardware implemented by one or more transistors). In the example of FIG. 2, the transform circuitry 220 is coupled to the residual generation circuitry 218 and the quantization circuitry 222. In the example of FIG. 2, the transform circuitry 220 receives the residual from the residual generation circuitry 218 and executes a transform algorithm to reduce the residual (e.g., the data that is not predicted). For example, the transform circuitry 220 generates a transformed residual by executing a DCT with the residual as an input. By executing the DCT, the transform circuitry 220 maximizes the characteristics of the block with minimal coefficients and concentrates most of the signal information into low frequency components of the DCT. The output of the transform circuitry 220 is a vector of coefficients (e.g., transform coefficients).

In the illustrated example of FIG. 2, the quantization circuitry 222 is implemented by processor circuitry such as one or more special-purpose electrical circuits structured to perform specific operation(s) and including one or more semiconductor-based logic devices (e.g., electrical hardware implemented by one or more transistors). In the example of FIG. 2, the quantization circuitry 222 is coupled to the transform circuitry 220, the first multi-symbol entropy coding circuitry 224a, and the first inverse quantization circuitry 226a. In the example of FIG. 2, the quantization circuitry 222 quantizes the transformed residual. For example, the quantization circuitry 222 removes insignificant values of the transformed residual (e.g., near zero values of the DCT). The output from the quantization circuitry 222 is a vector of quantized coefficients. Each of the quantized coefficients can be represented by a combination of one or more symbols. For example, the symbols may represent the sign of the quantized coefficient, the absolute value of the quantized coefficient, a lower limit (l) for the quantized coefficient, an upper limit (r) for the quantized coefficient, and/or any other value. The number of symbols is defined by the size of the alphabet being implemented by the encoding system 202.

In the illustrated example of FIG. 2, the first multi-symbol entropy coding circuitry 224a is implemented by processor circuitry such as one or more special-purpose electrical circuits structured to perform specific operation(s) and including one or more semiconductor-based logic devices (e.g., electrical hardware implemented by one or more transistors). In the example of FIG. 2, the first multi-symbol entropy coding circuitry 224a is coupled to the quantization circuitry 222 and the network 206. In the example of FIG. 2, the first multi-symbol entropy coding circuitry 224a executes an entropy encoding algorithm described further herein to encode the current block into a bitstream. For example, the first multi-symbol entropy coding circuitry 224a encodes the symbols of the quantized coefficients into the bitstream based on respective ranges (e.g., defined by the lower limit and upper limit) for the quantized coefficients and the size of the alphabet.

In the illustrated example of FIG. 2, the encoded bitstream generated by the first multi-symbol entropy coding circuitry 224a is transmitted to the decoding system 204 via the network 206. However, in additional or alternative examples, the encoded bitstream generated by the first multi-symbol entropy coding circuitry 224a is stored in memory and/or transmission to the decoding system 204 via the network 206. In some examples, the encoding system 202 may operate in a decoding mode to decode the encoded bitstream from memory for display on the encoding system 202.

In the illustrated example of FIG. 2, the first inverse quantization circuitry 226a is implemented by processor circuitry such as one or more special-purpose electrical circuits structured to perform specific operation(s) and including one or more semiconductor-based logic devices (e.g., electrical hardware implemented by one or more transistors). In the example of FIG. 2, the first inverse quantization circuitry 226a is coupled to the quantization circuitry 222 and the first inverse transform circuitry 228a. In the example of FIG. 2, the first inverse quantization circuitry 226a performs inverse quantization to regenerate the transformed residual.

In the illustrated example of FIG. 2, the first inverse transform circuitry 228a is implemented by processor circuitry such as one or more special-purpose electrical circuits structured to perform specific operation(s) and including one or more semiconductor-based logic devices (e.g., electrical hardware implemented by one or more transistors). In the example of FIG. 2, the first inverse transform circuitry 228a is coupled to the first inverse quantization circuitry 226a and the first frame reconstruction circuitry 230a. In the example of FIG. 2, the first inverse transform circuitry 228a receives the transformed residual and executes an inverse transform algorithm to regenerate the residual.

In the illustrated example of FIG. 2, the first frame reconstruction circuitry 230a is implemented by processor circuitry such as one or more special-purpose electrical circuits structured to perform specific operation(s) and including one or more semiconductor-based logic devices (e.g., electrical hardware implemented by one or more transistors). In the example of FIG. 2, the first frame reconstruction circuitry 230a is coupled to the first inter-prediction circuitry 214a, the first prediction selection circuitry 216a, and the first inverse transform circuitry 228a. In the example of FIG. 2, the first frame reconstruction circuitry 230a generates a reference frame by combining the prediction selected by the first prediction selection circuitry 216a with the residual received from the first inverse transform circuitry 228a. In the example of FIG. 2, the first frame reconstruction circuitry 230a implements a decoder picture buffer that stores one or more reference frames that are used by the first inter-prediction circuitry 214a in making inter-predictions. In some examples, the first frame reconstruction circuitry 230a implements a deblocking filter to improve the quality of the one or more reference frames.

In the illustrated example of FIG. 2, the network 206 is a system of interconnected systems exchanging data. In some examples, the network 206 may be implemented using any type of public or private network such as the Internet, a telephone network, a local area network (LAN), a cable network, and/or a wireless network. In some examples, to enable communication via the network 206, the example encoding system 202 and/or the example decoding system 204 include communication interface(s) that enable(s) a connection to an Ethernet, a digital subscriber line (DSL), a telephone line, a coaxial cable, and/or any wireless connection, etc.

In the illustrated example of FIG. 2, the example decoding system 204 includes example second multi-symbol entropy coding circuitry 224b, example second intra-prediction circuitry 212b, example second inter-prediction circuitry 214b, example second prediction selection circuitry 216b, example second inverse quantization circuitry 226b, example second inverse transform circuitry 228b, and example second frame reconstruction circuitry 230b. In the example of FIG. 2, the decoding system 204 obtains media from an encoded bitstream via the network 206. However, in additional or alternative examples, the decoding system 204 obtains encoded media from memory.

In the illustrated example of FIG. 2, the second multi-symbol entropy coding circuitry 224b is implemented by processor circuitry such as one or more special-purpose electrical circuits structured to perform specific operation(s) and including one or more semiconductor-based logic devices (e.g., electrical hardware implemented by one or more transistors). In the example of FIG. 2, the second multi-symbol entropy coding circuitry 224b is coupled to the network 206, the second intra-prediction circuitry 212b, the second inter-prediction circuitry 214b, and the second inverse quantization circuitry 226b. In the example of FIG. 2, the second multi-symbol entropy coding circuitry 224b executes an entropy decoding algorithm described further herein to decode information from the bitstream. For example, the second multi-symbol entropy coding circuitry 224b decodes the bitstream based on respective ranges (e.g., defined by the lower limit and upper limit) for the quantized coefficients encoded therein and the size of the alphabet.

In the illustrated example of FIG. 2, the second intra-prediction circuitry 212b is implemented by processor circuitry such as one or more special-purpose electrical circuits structured to perform specific operation(s) and including one or more semiconductor-based logic devices (e.g., electrical hardware implemented by one or more transistors). In the example of FIG. 2, the second intra-prediction circuitry 212b is coupled to the second multi-symbol entropy coding circuitry 224b and the second prediction selection circuitry 216b. In the example of FIG. 2, the second intra-prediction circuitry 212b receives a decoded block and searches for another block within the current frame that can be copied or that is the same or substantially the same as the current block. The second intra-prediction circuitry 212b may implement equation 3 and/or equation 4 described above to perform exponential smoothing of predictions. After determining a block from within the current frame that can be copied (e.g., an intra-prediction), the second intra-prediction circuitry 212b sends the block to the second prediction selection circuitry 216b.

In the illustrated example of FIG. 2, the second inter-prediction circuitry 214b is implemented by processor circuitry such as one or more special-purpose electrical circuits structured to perform specific operation(s) and including one or more semiconductor-based logic devices (e.g., electrical hardware implemented by one or more transistors). In some examples, the second inter-prediction circuitry 214b is referred to as motion estimation circuitry. In the example of FIG. 2, the second inter-prediction circuitry 214b is coupled to the second multi-symbol entropy coding circuitry 224b, the second prediction selection circuitry 216b, and the second frame reconstruction circuitry 230b. In the example of FIG. 2, the second inter-prediction circuitry 214b receives a block in the current frame of video being processed and searches for another block in another frame or other frames that can be copied or that is the same or substantially the same as the current block. After determining a block from another frame or other frames that can be copied (e.g., an inter-prediction), the second inter-prediction circuitry 214b sends the block to the second prediction selection circuitry 216b.

In the illustrated example of FIG. 2, the second prediction selection circuitry 216b is implemented by processor circuitry such as one or more special-purpose electrical circuits structured to perform specific operation(s) and including one or more semiconductor-based logic devices (e.g., electrical hardware implemented by one or more transistors). In the example of FIG. 2, the second prediction selection circuitry 216b is coupled to the second intra-prediction circuitry 212b, the second inter-prediction circuitry 214b, and the second frame reconstruction circuitry 230b. In the example of FIG. 2, the second prediction selection circuitry 216b receives the block predicted by the second intra-prediction circuitry 212b (e.g., an intra-prediction) and the block predicted by the second inter-prediction circuitry 214b (e.g., an inter-prediction). The second prediction selection circuitry 216b selects one of the intra-prediction block or the inter-prediction block based on one or more profit criteria (e.g., based on the amount of bytes required to decode the blocks, based on the quality of the blocks, etc.).

In the illustrated example of FIG. 2, the second inverse quantization circuitry 226b is implemented by processor circuitry such as one or more special-purpose electrical circuits structured to perform specific operation(s) and including one or more semiconductor-based logic devices (e.g., electrical hardware implemented by one or more transistors). In the example of FIG. 2, the second inverse quantization circuitry 226b is coupled to the second multi-symbol entropy coding circuitry 224b and the second inverse transform circuitry 228b. In the example of FIG. 2, the second inverse quantization circuitry 226b performs inverse quantization to regenerate the transformed residual.

In the illustrated example of FIG. 2, the second inverse transform circuitry 228b is implemented by processor circuitry such as one or more special-purpose electrical circuits structured to perform specific operation(s) and including one or more semiconductor-based logic devices (e.g., electrical hardware implemented by one or more transistors). In the example of FIG. 2, the second inverse transform circuitry 228b is coupled to the second inverse quantization circuitry 226b and the second frame reconstruction circuitry 230b. In the example of FIG. 2, the second inverse transform circuitry 228b receives the transformed residual and executes an inverse transform algorithm to regenerate the residual.

In the illustrated example of FIG. 2, the second frame reconstruction circuitry 230b is implemented by processor circuitry such as one or more special-purpose electrical circuits structured to perform specific operation(s) and including one or more semiconductor-based logic devices (e.g., electrical hardware implemented by one or more transistors). In the example of FIG. 2, the second frame reconstruction circuitry 230b is coupled to the second inter-prediction circuitry 214b, the second prediction selection circuitry 216b, and the second inverse transform circuitry 228b. In the example of FIG. 2, the second frame reconstruction circuitry 230b generates an output frame by combining the prediction selected by the second prediction selection circuitry 216b with the residual received from the second inverse transform circuitry 228b. In some examples, the second frame reconstruction circuitry 230b implements a deblocking filter to improve the quality of one or more frames of the output video 208.

In the illustrated example of FIG. 2, each of the encoding system 202 and the decoding system 204 includes instances of the same hardware, software, and/or firmware. For example, the encoding system 202 and the decoding system 204 may be implemented by two instances of the same hardware, software, and/or firmware (e.g., a video codec). In the example of FIG. 2, the hardware, software, and/or firmware implementing the encoding system 202 is operating in an encoding mode and the hardware, software, and/or firmware implementing the decoding system 204 is operating in a decoding mode. In additional or alternative examples, the hardware, software, and/or firmware implementing the encoding system 202 may operate in a decoding mode and the hardware, software, and/or firmware implementing the decoding system 204 may operate in an encoding mode. As such, each of the encoding system 202 and the decoding system 204 includes intra-prediction circuitry, inter-prediction circuitry, prediction selection circuitry, residual generation circuitry, transform circuitry, quantization circuitry, multi-symbol entropy coding circuitry, inverse quantization circuitry, inverse transform circuitry, and frame reconstruction circuitry.

In some examples, the encoding system 202 and/or the decoding system 204 includes means for performing intra-prediction. For example, the means for performing intra-prediction may be implemented by the intra-prediction circuitry 212. In some examples, the intra-prediction circuitry 212 may be instantiated by processor circuitry such as the example processor circuitry 1312 of FIG. 13. For instance, the intra-prediction circuitry 212 may be instantiated by the example general-purpose processor circuitry 1400 of FIG. 14 executing machine executable instructions such as that implemented by at least blocks 502, 504, and 524 of FIG. 5 and/or at least block 804 of FIG. 8. In some examples, the intra-prediction circuitry 212 may be instantiated by hardware logic circuitry, which may be implemented by an ASIC or the FPGA circuitry 1500 of FIG. 15 structured to perform operations corresponding to the machine-readable instructions (e.g., operations corresponding to instructions). Additionally or alternatively, the intra-prediction circuitry 212 may be instantiated by any other combination of hardware, software, and/or firmware. For example, the intra-prediction circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate. In some examples, an ASIC refers to Application Specific Integrated Circuitry.

In some examples, the encoding system 202 and/or the decoding system 204 includes means for inter-prediction. For example, the means for performing inter-prediction may be implemented by the performing inter-prediction circuitry 214. In some examples, the inter-prediction circuitry 214 may be instantiated by processor circuitry such as the example processor circuitry 1312 of FIG. 13. For instance, the inter-prediction circuitry 214 may be instantiated by the example general-purpose processor circuitry 1400 of FIG. 14 executing machine executable instructions such as that implemented by at least blocks 502, 506, and 524 of FIG. 5 and/or at least block 806 of FIG. 8. In some examples, the inter-prediction circuitry 214 may be instantiated by hardware logic circuitry, which may be implemented by an ASIC or the FPGA circuitry 1500 of FIG. 15 structured to perform operations corresponding to the machine-readable instructions. Additionally or alternatively, the inter-prediction circuitry 214 may be instantiated by any other combination of hardware, software, and/or firmware. For example, the inter-prediction circuitry 214 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the encoding system 202 and/or the decoding system 204 includes means for performing prediction selection. For example, the means for performing prediction selection may be implemented by the prediction selection circuitry 216. In some examples, the prediction selection circuitry 216 may be instantiated by processor circuitry such as the example processor circuitry 1312 of FIG. 13. For instance, the prediction selection circuitry 216 may be instantiated by the example general-purpose processor circuitry 1400 of FIG. 14 executing machine executable instructions such as that implemented by at least block 508 of FIG. 5 and/or at least block 808 of FIG. 8. In some examples, the prediction selection circuitry 216 may be instantiated by hardware logic circuitry, which may be implemented by an ASIC or the FPGA circuitry 1500 of FIG. 15 structured to perform operations corresponding to the machine-readable instructions. Additionally or alternatively, the prediction selection circuitry 216 may be instantiated by any other combination of hardware, software, and/or firmware. For example, the prediction selection circuitry 216 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the encoding system 202 and/or the decoding system 204 includes means for generating a residual. For example, the means for generating a residual may be implemented by the residual generation circuitry 218. In some examples, the residual generation circuitry 218 may be instantiated by processor circuitry such as the example processor circuitry 1312 of FIG. 13. For instance, the residual generation circuitry 218 may be instantiated by the example general-purpose processor circuitry 1400 of FIG. 14 executing machine executable instructions such as that implemented by at least block 510 of FIG. 5. In some examples, the residual generation circuitry 218 may be instantiated by hardware logic circuitry, which may be implemented by an ASIC or the FPGA circuitry 1500 of FIG. 15 structured to perform operations corresponding to the machine-readable instructions. Additionally or alternatively, the residual generation circuitry 218 may be instantiated by any other combination of hardware, software, and/or firmware. For example, the residual generation circuitry 218 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the encoding system 202 and/or the decoding system 204 includes means for transforming a residual. For example, the means for transforming a residual may be implemented by the transform circuitry 220. In some examples, the transform circuitry 220 may be instantiated by processor circuitry such as the example processor circuitry 1312 of FIG. 13. For instance, the transform circuitry 220 may be instantiated by the example general-purpose processor circuitry 1400 of FIG. 14 executing machine executable instructions such as that implemented by at least block 512 of FIG. 5. In some examples, the transform circuitry 220 may be instantiated by hardware logic circuitry, which may be implemented by an ASIC or the FPGA circuitry 1500 of FIG. 15 structured to perform operations corresponding to the machine-readable instructions. Additionally or alternatively, the transform circuitry 220 may be instantiated by any other combination of hardware, software, and/or firmware. For example, the transform circuitry 220 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the encoding system 202 and/or the decoding system 204 includes means for quantizing a transformed residual. For example, the means for quantizing a transformed residual may be implemented by the quantization circuitry 222. In some examples, the quantization circuitry 222 may be instantiated by processor circuitry such as the example processor circuitry 1312 of FIG. 13. For instance, the quantization circuitry 222 may be instantiated by the example general-purpose processor circuitry 1400 of FIG. 14 executing machine executable instructions such as that implemented by at least block 514 of FIG. 5. In some examples, the quantization circuitry 222 may be instantiated by hardware logic circuitry, which may be implemented by an ASIC or the FPGA circuitry 1500 of FIG. 15 structured to perform operations corresponding to the machine-readable instructions. Additionally or alternatively, the quantization circuitry 222 may be instantiated by any other combination of hardware, software, and/or firmware. For example, the quantization circuitry 222 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the encoding system 202 and/or the decoding system 204 includes means for performing multi-symbol entropy coding. For example, the means for performing multi-symbol entropy coding may be implemented by the multi-symbol entropy coding circuitry 224. In some examples, the multi-symbol entropy coding circuitry 224 may be instantiated by processor circuitry such as the example processor circuitry 1312 of FIG. 13. For instance, the multi-symbol entropy coding circuitry 224 may be instantiated by the example general-purpose processor circuitry 1400 of FIG. 14 executing machine executable instructions such as that implemented by at least block 516 of FIG. 5 and/or at least blocks 802 and 816 of FIG. 8. In some examples, the multi-symbol entropy coding circuitry 224 may be instantiated by hardware logic circuitry, which may be implemented by an ASIC or the FPGA circuitry 1500 of FIG. 15 structured to perform operations corresponding to the machine-readable instructions. Additionally or alternatively, the multi-symbol entropy coding circuitry 224 may be instantiated by any other combination of hardware, software, and/or firmware. For example, the multi-symbol entropy coding circuitry 224 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the encoding system 202 and/or the decoding system 204 includes means for performing inverse quantization. For example, the means for performing inverse quantization may be implemented by the inverse quantization circuitry 226. In some examples, the inverse quantization circuitry 226 may be instantiated by processor circuitry such as the example processor circuitry 1312 of FIG. 13. For instance, the inverse quantization circuitry 226 may be instantiated by the example general-purpose processor circuitry 1400 of FIG. 14 executing machine executable instructions such as that implemented by at least block 518 of FIG. 5 and/or at least block 810 of FIG. 8. In some examples, the inverse quantization circuitry 226 may be instantiated by hardware logic circuitry, which may be implemented by an ASIC or the FPGA circuitry 1500 of FIG. 15 structured to perform operations corresponding to the machine-readable instructions. Additionally or alternatively, the inverse quantization circuitry 226 may be instantiated by any other combination of hardware, software, and/or firmware. For example, the inverse quantization circuitry 226 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the encoding system 202 and/or the decoding system 204 includes means for performing inverse transformation. For example, the means for performing inverse transformation may be implemented by the inverse transform circuitry 228. In some examples, the inverse transform circuitry 228 may be instantiated by processor circuitry such as the example processor circuitry 1312 of FIG. 13. For instance, the inverse transform circuitry 228 may be instantiated by the example general-purpose processor circuitry 1400 of FIG. 14 executing machine executable instructions such as that implemented by at least block 520 of FIG. 5 and/or at least block 812 of FIG. 8. In some examples, the inverse transform circuitry 228 may be instantiated by hardware logic circuitry, which may be implemented by an ASIC or the FPGA circuitry 1500 of FIG. 15 structured to perform operations corresponding to the machine-readable instructions. Additionally or alternatively, the inverse transform circuitry 228 may be instantiated by any other combination of hardware, software, and/or firmware. For example, the inverse transform circuitry 228 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the encoding system 202 and/or the decoding system 204 includes means for reconstructing a frame. For example, the means for reconstructing a frame may be implemented by the frame reconstruction circuitry 230. In some examples, the frame reconstruction circuitry 230 may be instantiated by processor circuitry such as the example processor circuitry 1312 of FIG. 13. For instance, the frame reconstruction circuitry 230 may be instantiated by the example general-purpose processor circuitry 1400 of FIG. 14 executing machine executable instructions such as that implemented by at least block 522 of FIG. 5 and/or at least block 814 of FIG. 8. In some examples, the frame reconstruction circuitry 230 may be instantiated by hardware logic circuitry, which may be implemented by an ASIC or the FPGA circuitry 1500 of FIG. 15 structured to perform operations corresponding to the machine-readable instructions. Additionally or alternatively, the frame reconstruction circuitry 230 may be instantiated by any other combination of hardware, software, and/or firmware. For example, the frame reconstruction circuitry 230 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

Figure 3:
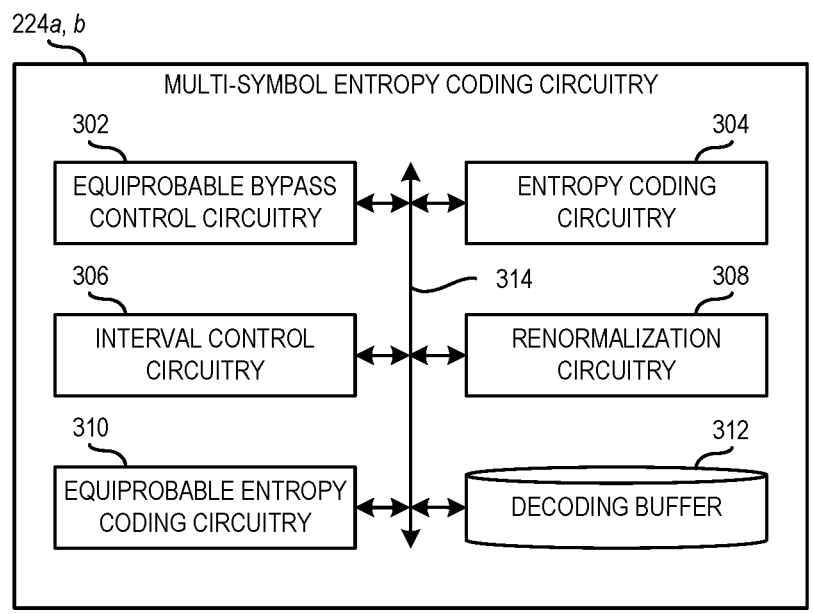
FIG. 3 is a block diagram of an example implementation of the multi-symbol entropy coding circuitry of FIG. 2.

FIG. 3 is a block diagram of an example implementation of the multi-symbol entropy coding circuitry 224 of FIG. 2 to execute and/or instantiate entropy encoding and/or decoding algorithms described herein. For example, the multi-symbol entropy coding circuitry 224 illustrated in FIG. 3 may implement the first multi-symbol entropy coding circuitry 224a and/or the second multi-symbol entropy coding circuitry 224b. The multi-symbol entropy coding circuitry 224 of FIG. 3 may be instantiated (e.g., creating an instance of, bring into being for any length of time, materialize, implement, etc.) by processor circuitry such as a central processor unit executing instructions. Additionally or alternatively, the multi-symbol entropy coding circuitry 224 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

In the illustrated example of FIG. 3, the multi-symbol entropy coding circuitry 224 includes example equiprobable bypass control circuitry 302, example entropy coding circuitry 304, example interval control circuitry 306, example equiprobable entropy coding circuitry 310, example renormalization circuitry 308, and an example decoding buffer 312. In the example of FIG. 3, each of the equiprobable bypass control circuitry 302, the entropy coding circuitry 304, the interval control circuitry 306, the equiprobable entropy coding circuitry 310, the renormalization circuitry 308, and the decoding buffer 312 is in communication with the other elements of the multi-symbol entropy coding circuitry 224. For example, the equiprobable bypass control circuitry 302, the entropy coding circuitry 304, the interval control circuitry 306, the equiprobable entropy coding circuitry 310, the renormalization circuitry 308, and/or the decoding buffer 312 are in communication via a communication bus 314.

In some examples disclosed herein, the equiprobable bypass control circuitry 302, the entropy coding circuitry 304, the interval control circuitry 306, the equiprobable entropy coding circuitry 310, the renormalization circuitry 308, and/or the decoding buffer 312 may be in communication via any suitable wired and/or wireless communication system. Additionally, in some examples disclosed herein, each of the equiprobable bypass control circuitry 302, the entropy coding circuitry 304, the interval control circuitry 306, the equiprobable entropy coding circuitry 310, the renormalization circuitry 308, and/or the decoding buffer 312 may be in communication with any component exterior to the multi-symbol entropy coding circuitry 224 via any suitable wired and/or wireless communication system.

In the illustrated example of FIG. 3, the equiprobable bypass control circuitry 302 determines whether an equiprobable bypass mode is available to encode a current block being processed and/or to decode a bitstream. In the example of FIG. 3, if an equiprobable bypass mode is not available, the entropy coding circuitry 304 performs standard multi-symbol entropy coding according to a selected video coding format (e.g., AV1, Daala, CABAC, etc.). In the example of FIG. 3, the multi-symbol entropy coding circuitry 224 operates differently depending on whether the alphabet size is a prime or non-prime number. For example, if the alphabet size is a prime number, the multi-symbol entropy coding circuitry 224 operates according to a first implementation. Additionally, for example, if the alphabet size is a non-prime number, the multi-symbol entropy coding circuitry 224 operates according to a second implementation.

First Implementation: Prime Number Alphabet Size

For prime number alphabet sizes, if the equiprobable bypass control circuitry 302 determines that equiprobable bypass mode is available, the equiprobable bypass control circuitry 302 initializes values and determines values to be used in later processing. For example, in an encoding mode, for an input symbol, the equiprobable bypass control circuitry 302 initializes an upper limit (R) to an upper value (RNG) and a lower limit (L) to a lower value (LOW). Additionally, in such an example encoding mode, the equiprobable bypass control circuitry 302 determines an alphabet size (N) and an approximate value (RN) approximating a product of (1) a quotient of (a) a difference between the alphabet size (N) and one and (b) the alphabet size (N) and (2) the upper limit (R)

$$\left(\text{e.g., } RN = \frac{N-1}{N} * R\right).$$

In such an example encoding mode, the equiprobable bypass control circuitry 302 additionally determines whether an input symbol to be encoded is greater than a reference value. For example, the reference value is zero.

In the example of FIG. 3, in an example decoding mode, the equiprobable bypass control circuitry 302 loads a portion of the received bitstream into the decoding buffer 312 and initializes an upper limit (R) to an upper value (RNG). Additionally, in such an example decoding mode, the equiprobable bypass control circuitry 302 determines an alphabet size (N) and an approximate value (RN) approximating a product of (1) a quotient of (a) a difference between the alphabet size (N) and one and (b) the alphabet size (N) and (2) the upper limit (R)

$$\left(e.g., RN = \frac{N-1}{N} * R\right).$$

In such an example decoding mode, the equiprobable bypass control circuitry 302 additionally sets an intermediate value (VW) equal to the approximate value (RN) left shifted by sixteen bits (e.g., VW=RN<<16). In such an example decoding mode, the equiprobable bypass control circuitry 302 additionally determines whether the current portion of the bitstream (DIF) in the decoding buffer 312 (DEC) is greater than or equal to the intermediate value. Additionally, in such an example decoding mode, the equiprobable bypass control circuitry 302 determines whether a decoded symbol value is greater than a reference value. For example, the reference value is zero.

In examples disclosed herein, situations where equiprobable bypass mode is available include when the number of updates in a context model is below a threshold (e.g., too small) and/or when probability estimation is not converged to expected (e.g., optimal values). In examples disclosed herein, situations where equiprobable bypass mode is available include when a-priori known probabilities are limited to 1/N. In examples disclosed herein, situations where equiprobable bypass mode is available include when the alphabet follows a geometric distribution. Additionally or alternatively, equiprobable bypass mode is available to improve coding (e.g., encoding and/or decoding) of transform coefficients and/or to reduce restrictions on alphabet size. In examples disclosed herein, equiprobable bypass mode is available when a real number of context bins is greater than a threshold (e.g., too large) and/or if the real state of a context model is unknown.

In examples disclosed herein, the interval control circuitry 306 performs interval subdivision when encoding symbols and/or decoding a bitstream. For example, the interval control circuitry 306 utilizes the approximate value during interval subdivision for N-symbol equiprobable mode entropy coding. Advantageously, approximate values disclosed herein may be determined without requiring division operations (e.g., the approximate values are derivable division-free) and provide high precision approximation. As such, example approximate values disclosed herein reduce processing complexity during entropy coding. Additionally, in some examples disclosed herein, example approximate values may be stored ahead of time, for example when there is a-priori knowledge.

In an example where N=3, the approximate value, R3, approximates the value $$\frac{2r}{3}.$$

The division-free formula with high precision for the approximate value, R3, is illustrated in equation 12. The approximate value, R3, is a truncated variant of equation 13.

$$R3 = ((r+1) >> 1) + ((r+4) >> 3) + ((r+16) >> 5) \quad \text{Equation 12}$$

$$\frac{2r}{3} = 2\frac{r}{4-1} = \frac{1}{2}\frac{r}{1-1/4} = \frac{r}{2}\left(1 + \frac{1}{4} + \frac{1}{4^2} + \frac{1}{4^3} + \cdots\right) \quad \text{Equation 13}$$

In an example where N=5, the approximate value, R5, approximates the value $$\frac{4r}{5}.$$

The division-free formula with high precision for the approximate value, R5, is illustrated in equation 14. The approximate value, R5, is a truncated variant of equation 15.

$$R5 = ((r) - ((r+2) >> 2) + ((r+8) >> 4)) \quad \text{Equation 14}$$

$$\frac{4r}{5} = 4\frac{r}{4+1} = \frac{r}{1+1/4} = r\left(1 - \frac{1}{4} + \frac{1}{4^2} + \frac{1}{4^3} + \cdots\right) \quad \text{Equation 15}$$

In an example where N=9, the approximate value, R9, approximates me value $$\frac{8r}{9}.$$

The division-free formula with high precision for the approximate value, R9, is illustrated in equation 16.

$$R9 = ((r) - ((r+4) >> 3) + ((r+32) >> 6)) \quad \text{Equation 16}$$

In an example where N=11, the approximate value, R11, approximates the value $$\frac{10r}{11}.$$

The division-free formula with high precision for the approximate value, R11, is illustrated in equation 17.

$$R11 = \quad \text{Equation 17}$$
$$((r) - ((r+8) >> 4) - ((r+32) >> 6) - ((r+64) >> 7))$$

In an example where N=13, the approximate value, R13, approximates the value $$\frac{12r}{13}.$$

The division-free formula with high precision for the approximate value, R13, is illustrated in equation 18.

$$R13 = ((r) - ((r+8) \gg 4) - \qquad \text{Equation 18}$$
$$((r+64) \gg 7) - ((r+128) \gg 128))$$

In examples disclosed herein similar approximate values for the terms $$\frac{6r}{7}$$

(for seven-symbol equiprobable coding) and $$\frac{14r}{15}$$

(for fifteen-symbol equiprobably coding). Other techniques to approximate the terms $$\frac{2r}{3}, \frac{4r}{5}, \frac{6r}{7}, \frac{8r}{9}, \frac{10r}{13}, \frac{12r}{13}, \text{ and } \frac{14r}{15}$$

are possible. For example, for an interval that is a K bit number where $z=2^K \text{mode}_N$, z can be represented as follows: $z=\Sigma b_i * 2^i$. Based on the above, any approximate value can be determined according to the somewhat less precise division-free formula illustrated in equation 19.

$$\frac{\text{Range}}{N} = \frac{\text{Range}}{N} \frac{2^K}{2^K} \approx \frac{\text{Range}}{1} \frac{z}{2^K} = \qquad \text{Equation 19}$$
$$\Sigma \text{Range } b_i 2^{i-k} \approx \Sigma b_i (\text{Range} \gg K - i)$$

By determining interval subdivision via approximate values as disclosed herein, examples disclosed herein do not require offset terms (e.g., 4*(N−(s−1); and 4*(N−(s+0) in pseudocode 2) to prevent the range of values within which an input value is to be encoded from approaching zero. Additionally, examples disclosed herein do not require additional memory to store the probability values (e.g., the terms fl and fh (e.g., CDFs) in pseudocode 2).

In an example encoding mode, in response to an initial determination that the input symbol is greater than the reference value, the example interval control circuitry 306 sets the lower limit equal to a sum of (a) a current value of the lower limit and (b) a difference between a current value of the upper limit and the approximate value. Additionally, in an example encoding mode, in response to an initial determination that the input symbol is greater than the reference value, the example interval control circuitry 306 sets the upper limit equal to the approximate value. For example, if the alphabet size is three (e.g., N=3), in response to an initial determination that the input symbol is greater than the reference value, the interval control circuitry 306 sets the upper limit and the lower limit according to equation 20 and equation 21, respectively.

$$L = L + R - R3 \qquad \text{Equation 20}$$

$$R = R3 \qquad \text{Equation 21}$$

In an example encoding mode, in response to an initial determination that the input symbol is not greater than the reference value, the example interval control circuitry 306 sets the upper limit equal to a difference between a current value of the upper limit and the approximate value. For example, if the alphabet size is three (e.g., N=3), in response to an initial determination that the input symbol is not greater than the reference value, the interval control circuitry 306 sets the upper limit according to equation 22.

$$R = R - R3 \qquad \text{Equation 22}$$

In an example encoding mode, in response to a subsequent determination that the input symbol is greater than the reference value, the example interval control circuitry 306 increments the lower value (e.g., LOW=LOW+1) and sets the upper value equal to the approximate value (e.g., RNG=RN).

In an example decoding mode, in response to a determination that the current portion of the bitstream (DIF) in the decoding buffer 312 (DEC) is greater than or equal to the intermediate value (VW), the example interval control circuitry 306 sets the portion of the bitstream (DIF) equal to a difference between the current portion of the bitstream (DIF) and the intermediate value (VW) (e.g., DIF=DIF−VW). Additionally, in response to an initial determination that the current portion of the bitstream (DIF) in the decoding buffer 312 (DEC) is greater than or equal to the intermediate value (VW), the example interval control circuitry 306 sets a new upper limit (R_NEW) equal to a difference between the current value of the upper limit (R) and the approximate value (RN) (e.g., R_NEW=R−RN). In response to an initial determination that the current portion of the bitstream (DIF) in the decoding buffer 312 (DEC) is greater than or equal to the intermediate value (VW), the example interval control circuitry 306 also sets a symbol value (RET) equal to zero.

In an example decoding mode, in response to a determination that the current portion of the bitstream (DIF) in the decoding buffer 312 (DEC) is not greater than or equal to the intermediate value (VW), the example interval control circuitry 306 sets the new upper limit (R_NEW) equal to the approximate value (RN) (e.g., R_NEW=RN). In response to a determination that the current portion of the bitstream (DIF) in the decoding buffer 312 (DEC) is not greater than or equal to the intermediate value (VW), the example interval control circuitry 306 also sets the symbol value (RET) equal to one.

In the illustrated example of FIG. 3, after the interval control circuitry 306 completes interval subdivision, the renormalization circuitry 308 renormalizes the interval. For example, in an encoding mode, the renormalization circuitry 308 renormalizes the upper limit (R) and the lower limit (L). In an example decoding mode, the renormalization circuitry 308 renormalizes the new upper limit (R_NEW) and the portion of the bitstream (DIF) in the decoding buffer 312 (DEC). To perform renormalization of the upper limit, the lower limit, the new upper limit, and/or the portion of the bitstream in the decoding buffer 312, the renormalization circuitry 308 shifts the upper limit, the lower limit, the new upper limit, and/or the portion of the bitstream in the decoding buffer 312 by a respective number of bits.

Figure 4:
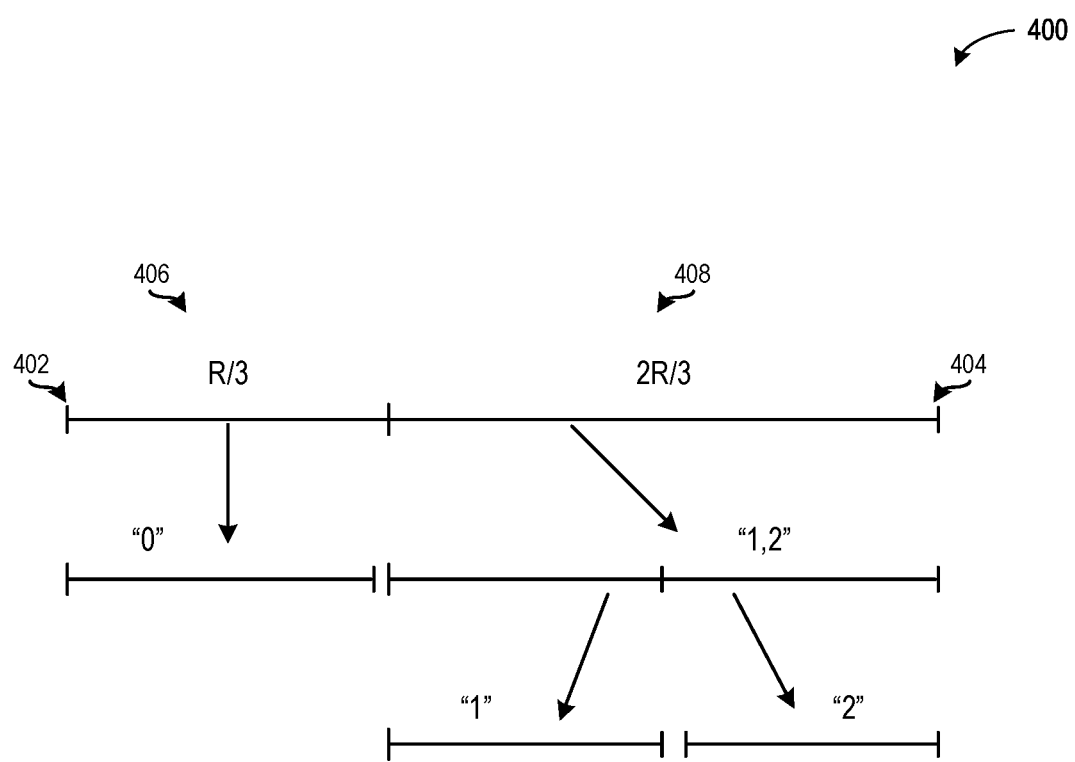
FIG. 4 is an illustration of interval subdivision for three symbol equiprobable mode entropy coding.

For example, FIG. 4 is an illustration of interval subdivision 400 for three symbol equiprobable mode entropy coding (e.g., "0", "1", "2"). That is, in the example of FIG. 4, the alphabet size is three (e.g., N=3). For example, if the video coding format is the HEVC format using CABAC, the lower value 402 of the interval is 256 and the upper value 404 of the interval is 511 (e.g., L=LOW=256, R=RNG=511, 256≤Interval≤511). In the example of FIG. 4, because the renormalization circuitry 308 is operating in a three symbol equiprobable mode, there is equal probability that each symbol will occur. As such, the initial interval can be considered to have two main sub-intervals, a first sub-interval 406 for a first symbol (e.g., "0") and a second sub-interval 408 for the second and third symbols (e.g., "1" and "2"). For example, the first symbol (e.g., "0") corresponds to the first sub-interval 406 and the second and third symbols (e.g., "1" and "2") correspond to the second sub-interval 408. In an encoding mode, after the equiprobable bypass control circuitry 302 determines if the input symbol is greater than the reference value, the renormalization circuitry 308 determines which of the sub-intervals the interval control circuitry 306 has selected based on the updated values of the lower limit and/or the upper limit. Table 5 illustrates the number of bits by which the renormalization circuitry 308 is to left shift the upper limit and lower limit depending on the interval and which of the first sub-interval 406 or the second sub-interval 408 was selected.

TABLE 5

| Interval Length | First Sub-Interval Length | Second Sub-Interval Length | Number of bits by which to Left Shift when the First Sub-Interval is Selected | Number of bits by which to Left Shift when the Second Sub-Interval is Selected |
|---|---|---|---|---|
| 256 | 88 | 168 | 2 | 1 |
| 257 | 88 | 169 | 2 | 1 |
| . | . | . | . | . |
| . | . | . | . | . |
| . | . | . | . | . |
| 373 | 127 | 246 | 2 | 1 |
| 374 | 128 | 246 | 1 | 1 |
| . | . | . | . | . |
| . | . | . | . | . |
| . | . | . | . | . |
| 388 | 133 | 255 | 1 | 1 |
| 389 | 133 | 256 | 1 | 0 |
| . | . | . | . | . |
| . | . | . | . | . |
| . | . | . | . | . |
| 510 | 175 | 335 | 1 | 0 |
| 511 | 175 | 336 | 1 | 0 |

Thus, for intervals between 256 and 374, (e.g., 256≤Interval<374), if the first sub-interval is selected, the renormalization circuitry 308 left shifts the upper limit and lower limit by 2 bits to renormalize the interval. Additionally, for intervals greater than 374 (e.g., 374<Interval), if the first sub-interval 406 is selected the renormalization circuitry 308 left shifts the upper limit and lower limit by 1 bit to renormalize the interval. Similarly, for intervals between 256 and 388, (e.g., 256≤Interval≤388), if the second sub-interval 408 is selected, the renormalization circuitry 308 left shifts the upper limit and lower limit by 1 bit to renormalize the interval. Additionally, for intervals greater than 389 (e.g., 389≤Interval), if the second sub-interval 408 is selected the renormalization circuitry 308 need not shift the upper limit and lower limit. In some examples disclosed herein, Table 5 and/or other tables corresponding to other video coding formats may be stored in memory and accessed during runtime of the multi-symbol entropy coding circuitry 224. In an example decoding mode, the renormalization circuitry 308 operates similarly on the new upper limit (R_NEW) and the portion of the bitstream (DIF) in the decoding buffer 312 (DEC).

In view of the previously encoded symbol (e.g., as determined by the values of the upper limit (R) and the lower limit (L)), the renormalization circuitry 308 renormalizes the upper limit and lower limit. For example, for the example three symbol equiprobable mode entropy coding (e.g., "0", "1", "2") illustrated in FIG. 4, examples disclosed herein may store in memory a data structure represented by Table 6 which can significantly improve calculation efficiency.

TABLE 6

| Previously Encoded Symbol | 256 ≤ Interval ≤ 373 | 374 ≤ Interval ≤ 388 | 389 ≤ Interval ≤ 511 |
|---|---|---|---|
| "0" | L = L << 2<br>R = R << 2 | L = L << 1<br>R = R << 1 | L = L << 1<br>R = R << 1 |
| "1" | L = (L + R) << 2<br>R = R3 << 1 | L = (L + R) << 2<br>R = R3 << 1 | L = (L + R) << 1<br>R = R3 |
| "2" | L = ((L + R) << 2) + (R3 << 1)<br>R = R3 << 1 | L = ((L + R) << 2) + (R3 << 1)<br>R = R3 << 1 | L = ((L + R) << 1) + R3<br>R = R3 |

The data structure represented in Table 6, can also be extended to two consequent symbols which generates the alphabet ["00", "01", "02", "10", "11", "12", "20", "21", "22"].

In the illustrated example of FIG. 3, the equiprobable entropy coding circuitry 310 encodes and/or decodes information when equiprobable bypass mode is available. In an example encoding mode, in response to a subsequent determination that the input symbol is greater than the reference value, the equiprobable entropy coding circuitry 310 performs binary entropy coding of one less than the value of the input symbol. For example, the equiprobable entropy coding circuitry 310 binarizes the input symbol and arithmetically encodes one less than the input symbol. In an example encoding mode, in response to a subsequent determination that the input symbol is not greater than the reference value, the interval control circuitry 306 increments the lower value (e.g., LOW=LOW+1) and sets the upper value equal to the approximate value (e.g., RNG=RN).

As described above, Rice-Golomb codes are other techniques to compress data according to which an integer x, greater than or equal to zero (e.g., x≥0), can be represented as illustrated in equation 5 above. Additionally, Golomb-Rice parameters can be computed in a simplified manner as described in equation 11 above but are limited to a subset of integer values (e.g., not any integer value). However, in examples disclosed herein, n can be any integer number.

According to examples disclosed herein, for value of the remainder where $q=(1-p)^2$, the equiprobable entropy coding circuitry 310 determines Golomb-Rice parameter according to equations 23 and 24.

$$\frac{1}{2} = (1-p)^{2n} \quad \text{Equation 23}$$

$$\frac{(\ln(2))*(E(X)+1/2)}{2} = n \quad \text{Equation 24}$$

Equations 23 and 24 are valid with high precision for transform coefficient coding for high bit depth and low Qp when p approaches (e.g., is close to) zero. In some examples, $\ln(2)$ can be substituted with 5/16, 19/64, . . .

$$\frac{\text{round}[(\ln(2))*2^n]}{2^n}.$$

Because the equiprobable entropy coding circuitry 310 does not rely on values of q that are equal to a power of two, the equiprobable entropy coding circuitry 310 determines fractional Rice parameters. Additionally, the equiprobable entropy coding circuitry 310 encodes Golomb-Rice parameters as unary values and encodes remainders from zero to q−1.

In an example decoding mode, in response to a determination that the symbol value (RET) is greater than a reference value (e.g., RET>0), the equiprobable entropy coding circuitry 310 sets the symbol value equal to a sum of the current value of the symbol and the output of binary equiprobable entropy decoding of the portion of the bitstream (DIF) in the decoding buffer 312 (DEC) and the upper limit (R). In such an example decoding mode, in response to a determination that the symbol value (RET) is not greater than a reference value (e.g., RET>0), the equiprobable bypass control circuitry 302 returns the symbol value.

Second Implementation: Non-Prime Number Alphabet Size

For non-prime number alphabet sizes, if the equiprobable bypass control circuitry 302 determines that equiprobable bypass mode is not available, the entropy coding circuitry 304 performs standard multi-symbol entropy coding according to the video coding format (e.g., AV1, Daala, CABAC, etc.). In an encoding mode, if the equiprobable bypass control circuitry 302 determines that equiprobable bypass mode is available, the equiprobable entropy coding circuitry 310 performs equiprobable entropy encoding that is a combination of functions with smaller alphabet sizes. For example, if the alphabet size is four (e.g., N=4), the equiprobable entropy coding circuitry 310 performs equiprobable encoding as a combination of two functions for alphabet size two (e.g., N=2). Similarly, in a decoding mode, if the equiprobable bypass control circuitry 302 determines that equiprobable bypass mode is available, the equiprobable entropy coding circuitry 310 performs equiprobable entropy decoding that is a combination of functions with smaller alphabet sizes. For example, if the alphabet size is four (e.g., N=4), the equiprobable entropy coding circuitry 310 performs equiprobable decoding as a combination of two functions for alphabet size two (e.g., N=2).

In some examples, the multi-symbol entropy coding circuitry 224 includes means for controlling equiprobable bypass mode. For example, the means for controlling equiprobable bypass mode may be implemented by the equiprobable bypass control circuitry 302. In some examples, the equiprobable bypass control circuitry 302 may be instantiated by processor circuitry such as the example processor circuitry 1312 of FIG. 13. For instance, the equiprobable bypass control circuitry 302 may be instantiated by the example general-purpose processor circuitry 1400 of FIG. 14 executing machine executable instructions such as that implemented by at least blocks 602, 606, 608, 609, 610, and 620 of FIG. 6; at least block 702 of FIG. 7; at least blocks 902, 906, 908, 910, 911, 912, 914, 928, and 932 of FIG. 9; and/or at least blocks 1002 and 1010 of FIG. 10. In some examples, the equiprobable bypass control circuitry 302 may be instantiated by hardware logic circuitry, which may be implemented by an ASIC or the FPGA circuitry 1500 of FIG. 15 structured to perform operations corresponding to the machine-readable instructions. Additionally or alternatively, the equiprobable bypass control circuitry 302 may be instantiated by any other combination of hardware, software, and/or firmware. For example, the equiprobable bypass control circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the multi-symbol entropy coding circuitry 224 includes means for entropy coding. For example, the means for entropy coding may be implemented by the entropy coding circuitry 304. In some examples, the entropy coding circuitry 304 may be instantiated by processor circuitry such as the example processor circuitry 1312 of FIG. 13. For instance, the entropy coding circuitry 304 may be instantiated by the example general-purpose processor circuitry 1400 of FIG. 14 executing machine executable instructions such as that implemented by at least block 604 of FIG. 6; at least block 704 of FIG. 7; at least block 904 of FIG. 9; and/or at least block 1004 of FIG. 10. In some examples, the entropy coding circuitry 304 may be instantiated by hardware logic circuitry, which may be implemented by an ASIC or the FPGA circuitry 1500 of FIG. 15 structured to perform operations corresponding to the machine-readable instructions. Additionally or alternatively, the entropy coding circuitry 304 may be instantiated by any other combination of hardware, software, and/or firmware. For example, the entropy coding circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the multi-symbol entropy coding circuitry 224 includes means for performing interval subdivision. For example, the means for performing interval subdivision may be implemented by the interval control circuitry 306. In some examples, the interval control circuitry 306 may be instantiated by processor circuitry such as the example processor circuitry 1312 of FIG. 13. For instance, the interval control circuitry 306 may be instantiated by the example general-purpose processor circuitry 1400 of FIG. 14 executing machine executable instructions such as that implemented by at least blocks 612, 614, 616, 624, and 626 of FIG. 6 and/or at least blocks 916, 918, 920, 922, and 924 of FIG. 9. In some examples, the interval control circuitry 306 may be instantiated by hardware logic circuitry, which may be implemented by an ASIC or the FPGA circuitry 1500 of FIG. 15 structured to perform operations corresponding to the machine-readable instructions. Additionally or alternatively, the interval control circuitry 306 may be instantiated by any other combination of hardware, software, and/or firmware. For example, the interval control circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the multi-symbol entropy coding circuitry 224 includes means for renormalizing. For example, the means for renormalizing may be implemented by the renormalization circuitry 308. In some examples, the renormalization circuitry 308 may be instantiated by processor circuitry such as the example processor circuitry 1312 of FIG. 13. For instance, the renormalization circuitry 308 may be instantiated by the example general-purpose processor circuitry 1400 of FIG. 14 executing machine executable instructions such as that implemented by at least block 618 of FIG. 6 and/or at least block 926 of FIG. 9. In some examples, the renormalization circuitry 308 may be instantiated by hardware logic circuitry, which may be implemented by an ASIC or the FPGA circuitry 1500 of FIG. 15 structured to perform operations corresponding to the machine-readable instructions. Additionally or alternatively, the renormalization circuitry 308 may be instantiated by any other combination of hardware, software, and/or firmware. For example, the interval control circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the multi-symbol entropy coding circuitry 224 includes means for equiprobable entropy coding. For example, the means for equiprobable entropy coding may be implemented by the equiprobable entropy coding circuitry 310. In some examples, the equiprobable entropy coding circuitry 310 may be instantiated by processor circuitry such as the example processor circuitry 1312 of FIG. 13. For instance, the equiprobable entropy coding circuitry 310 may be instantiated by the example general-purpose processor circuitry 1400 of FIG. 14 executing machine executable instructions such as that implemented by at least block 622 of FIG. 6; at least blocks 706 and 708 of FIG. 7; at least block 930 of FIG. 9; and/or at least blocks 1006 and 1008 of FIG. 10. In some examples, the equiprobable entropy coding circuitry 310 may be instantiated by hardware logic circuitry, which may be implemented by an ASIC or the FPGA circuitry 1500 of FIG. 15 structured to perform operations corresponding to the machine-readable instructions. Additionally or alternatively, the equiprobable entropy coding circuitry 310 may be instantiated by any other combination of hardware, software, and/or firmware. For example, the equiprobable entropy coding circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

While an example manner of implementing the encoding system 202 and/or the decoding system 204 of FIG. 2 is illustrated in FIG. 2, one or more of the elements, processes, and/or devices illustrated in FIG. 2 may be combined, divided, re-arranged, omitted, eliminated, and/or implemented in any other way. Additionally, while an example manner of implementing the multi-symbol entropy coding circuitry 224a, b of FIG. 2 is illustrated in FIG. 3, one or more of the elements, processes, and/or devices illustrated in FIG. 3 may be combined, divided, re-arranged, omitted, eliminated, and/or implemented in any other way. Further, the example intra-prediction circuitry 212a, b, the example inter-prediction circuitry 214a, b, the example prediction selection circuitry 216a, b, the example residual generation circuitry 218, the example transform circuitry 220, the example quantization circuitry 222, the example multi-symbol entropy coding circuitry 224a, b, the example inverse quantization circuitry 226a, b, the example inverse transform circuitry 228a, b, the example frame reconstruction circuitry 230a, b, and/or, more generally, the example the encoding system 202 and/or the example decoding system 204 of FIG. 2 and/or the example equiprobable bypass control circuitry 302, the example entropy coding circuitry 304, the example interval control circuitry 306, the example renormalization circuitry 308, the example equiprobable entropy coding circuitry 310, the example decoding buffer 312, and/or more generally, the example multi-symbol entropy coding circuitry 224a, b of FIG. 3 may be implemented by hardware alone or by hardware in combination with software and/or firmware. Thus, for example, any of the example intra-prediction circuitry 212a, b, the example inter-prediction circuitry 214a, b, the example prediction selection circuitry 216a, b, the example residual generation circuitry 218, the example transform circuitry 220, the example quantization circuitry 222, the example multi-symbol entropy coding circuitry 224a, b, the example inverse quantization circuitry 226a, b, the example inverse transform circuitry 228a, b, the example frame reconstruction circuitry 230a, b, and/or, more generally, the example the encoding system 202 and/or the example decoding system 204 of FIG. 2 and/or the example equiprobable bypass control circuitry 302, the example entropy coding circuitry 304, the example interval control circuitry 306, the example renormalization circuitry 308, the example equiprobable entropy coding circuitry 310, the example decoding buffer 312, and/or more generally, the example multi-symbol entropy coding circuitry 224a, b of FIG. 3, could be implemented by processor circuitry, analog circuit(s), digital circuit(s), logic circuit(s), programmable processor(s), programmable microcontroller(s), graphics processor unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example encoding system 202 and/or the example decoding system 204 of FIG. 2 and/or the example multi-symbol entropy coding circuitry 224a, b of FIG. 3 may include one or more elements, processes, and/or devices in addition to, or instead of, those illustrated in FIG. 2 and/or FIG. 3, and/or may include more than one of any or all of the illustrated elements, processes and devices.

Figure 5:
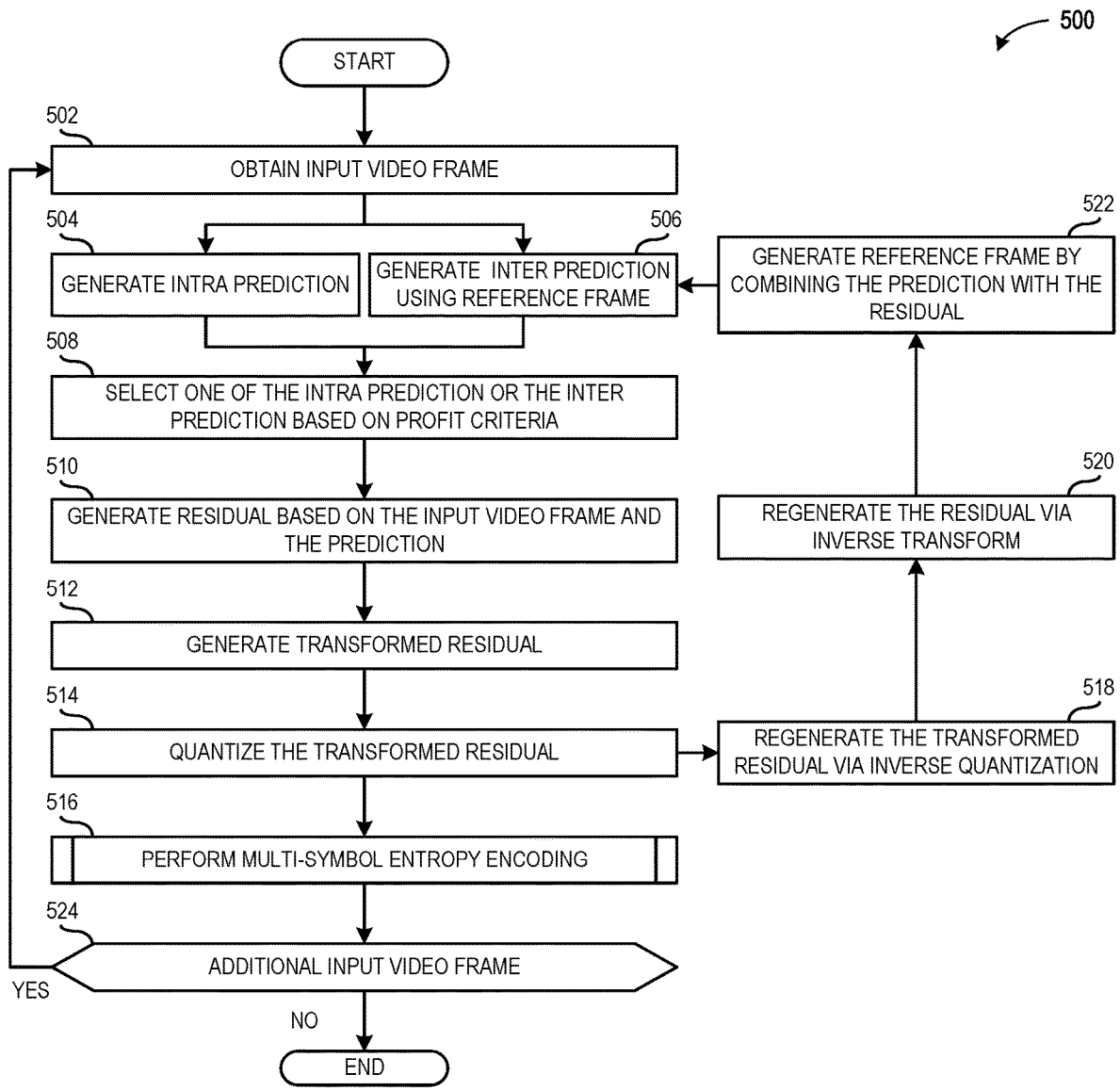
FIG. 5 is a flowchart representative of example machine-readable instructions and/or example operations that may be executed and/or instantiated by example processor circuitry to implement the encoding system of FIG. 2 to perform encoding.
Figure 6:
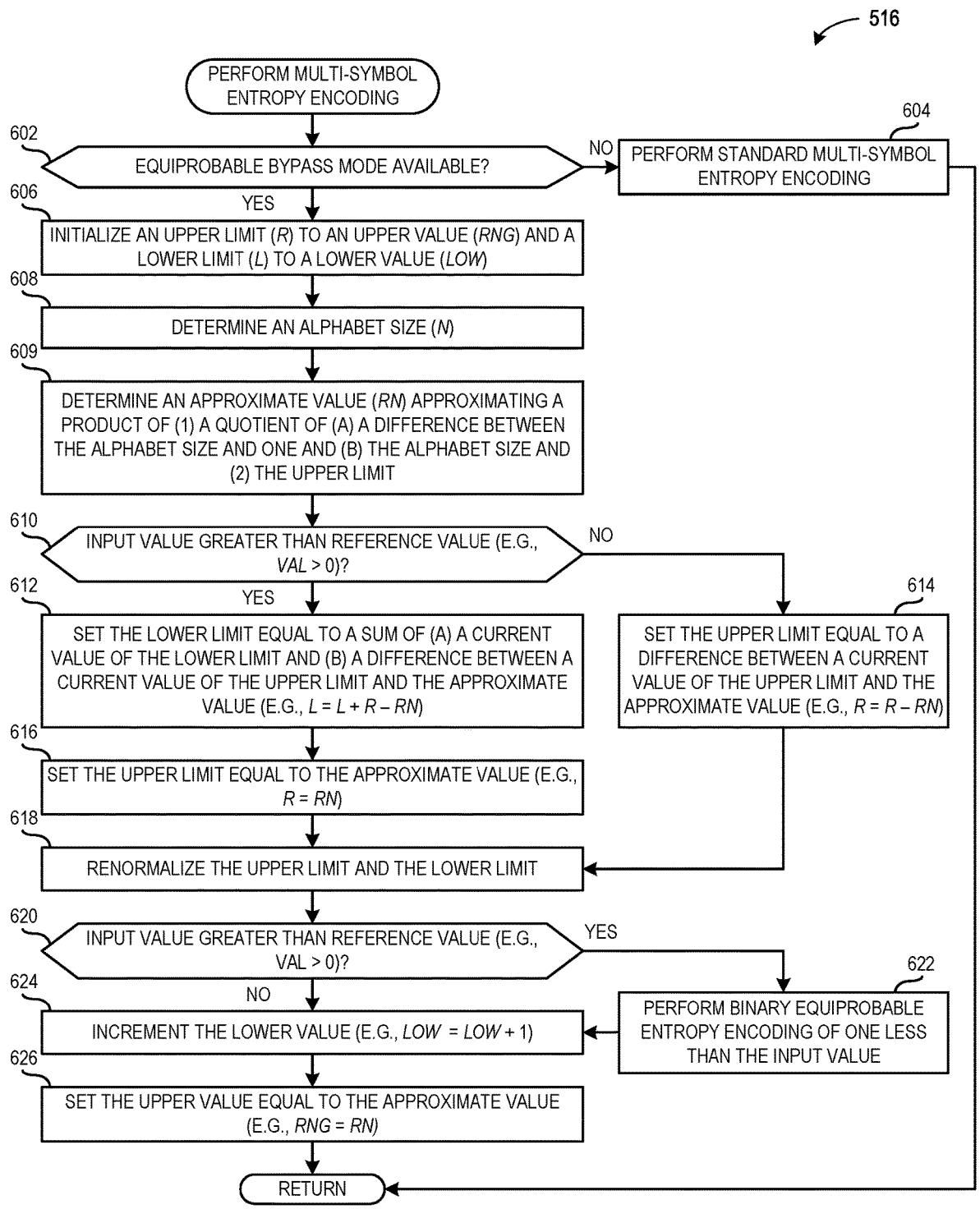
FIG. 6 is a flowchart representative of example machine-readable instructions and/or example operations that may be executed and/or instantiated by example processor circuitry to implement the multi-symbol entropy coding circuitry of FIGS. 2 and/or 3 to perform multi-symbol entropy encoding for prime numbered alphabets.
Figure 8:
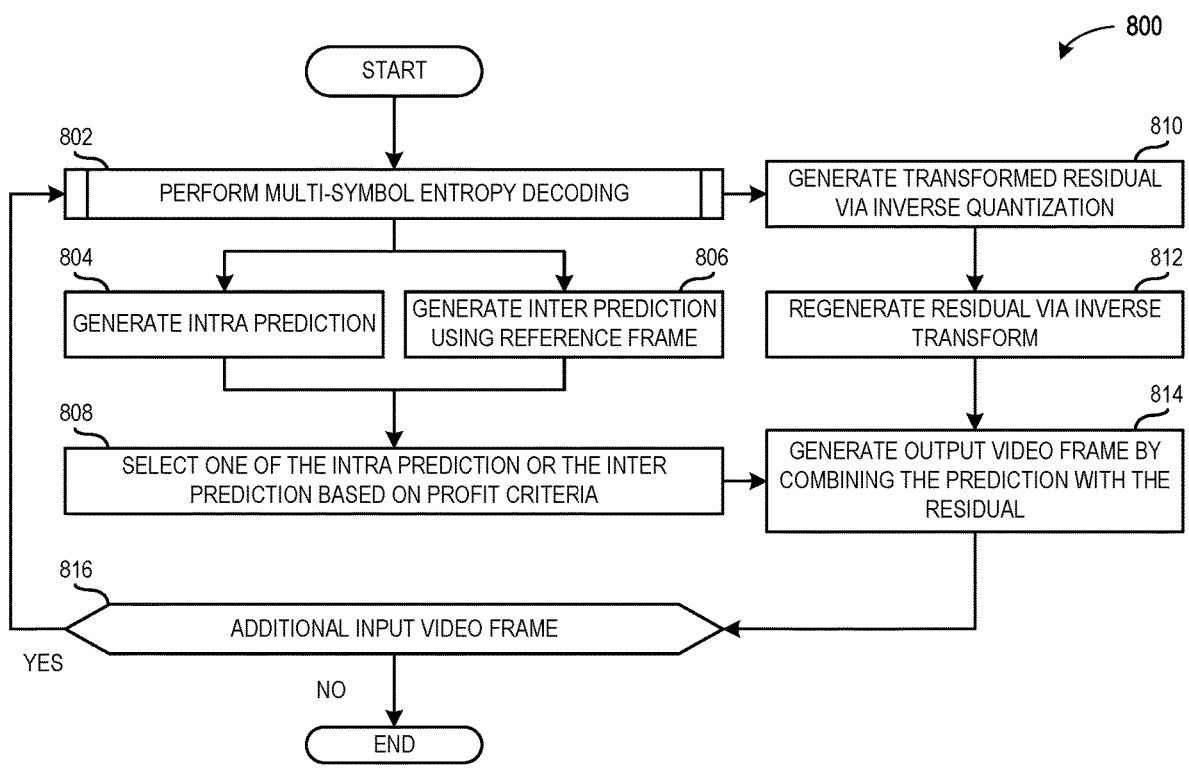
FIG. 8 is a flowchart representative of example machine-readable instructions and/or example operations that may be executed and/or instantiated by example processor circuitry to implement the decoding system of FIG. 2 to perform decoding.
Figure 9:
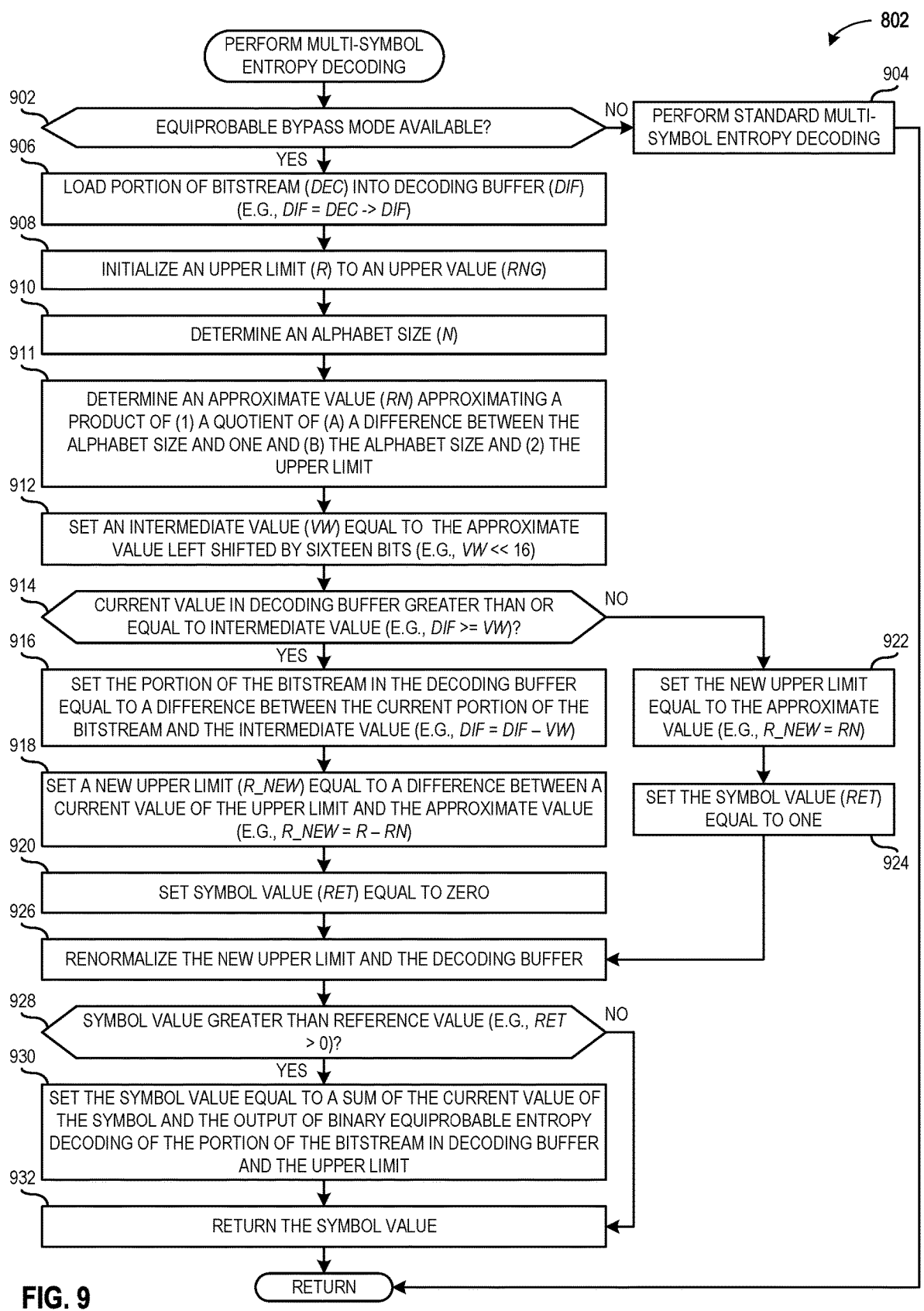
FIG. 9 is a flowchart representative of example machine-readable instructions and/or example operations that may be executed and/or instantiated by example processor circuitry to implement the multi-symbol entropy coding circuitry of FIGS. 2 and/or 3 to perform multi-symbol entropy decoding for prime numbered alphabets.

Flowcharts representative of example hardware logic circuitry, machine-readable instructions, hardware implemented state machines, and/or any combination thereof for implementing the example encoding system 202 of FIG. 2 and/or the multi-symbol entropy coding circuitry 224a, b of FIG. 3 are shown in FIGS. 5, 6, and/or 7. Flowcharts representative of example hardware logic circuitry, machine-readable instructions, hardware implemented state machines, and/or any combination thereof for implementing the example decoding system 204 of FIG. 2 and/or the multi-symbol entropy coding circuitry 224a, b of FIG. 3 are shown in FIGS. 8, 9, and/or 10. The machine-readable instructions may be one or more executable and/or instantiate-able programs or portion(s) of an executable and/or instantiate-able program for execution and/or instantiation by processor circuitry, such as the processor circuitry 1312 shown in the example processor platform 1300 discussed below in connection with FIG. 13 and/or the example processor circuitry discussed below in connection with FIGS. 14 and/or 15. The program(s) may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed and/or instantiated by one or more hardware devices other than the processor circuitry and/or embodied in firmware or dedicated hardware. The machine-readable instructions may be distributed across multiple hardware devices and/or executed by two or more hardware devices (e.g., a server and a client hardware device). Additionally, the machine-readable instructions may be distributed across multiple hardware devices and/or instantiated by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5, 6, and/or 7, many other methods of implementing the example encoding system 202 of FIG. 2 and/or the example multi-symbol entropy coding circuitry 224a, b of FIG. 3 may alternatively be used. Additionally, although the example program is described with reference to the flowcharts illustrated in FIGS. 8, 9, and/or 10, many other methods of implementing the example decoding system 204 of FIG. 2 and/or the example multi-symbol entropy coding circuitry 224a, b of FIG. 3 may alternatively be used. For example, the order of execution and/or instantiation of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine executable and/or instantiate-able instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable and/or instantiate-able instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute and/or instantiate the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed and/or instantiated in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 5, 6, 7, 8, 9, and/or 10 may be implemented using executable and/or instantiate-able instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine-readable instructions and/or example operations 500 that may be executed and/or instantiated by example processor circuitry to implement the encoding system 202 of FIG. 2 to perform encoding. The machine-readable instructions and/or the operations 500 of FIG. 5 begin at block 502, at which at least one of the example first intra-prediction circuitry 212a or the example first inter-prediction circuitry 214a of FIG. 2 obtains an input video frame. For example, at block 502, at least one of the first intra-prediction circuitry 212a or the first inter-prediction circuitry 214a obtains video on a per-frame basis where each frame is divided into one or more blocks (e.g., superblocks and/or smaller blocks).

In the illustrated example of FIG. 5, at block 504 the first intra-prediction circuitry 212a generates an intra-prediction based on the input video frame. For example, at block 504, the first intra-prediction circuitry 212a receives a block in the current frame of video being processed and searches for another block within the current frame that can be copied or that is the same or substantially the same as the current block (e.g., the intra-prediction). At block 506, the example first inter-prediction circuitry 214a generates an inter-prediction using one or more reference frames. For example, at block 506, the first inter-prediction circuitry 214a receives a block in the current frame of video being processed and searches for another block in another frame or other frames that can be copied or that is the same or substantially the same as the current block (e.g., the inter-prediction).

In the illustrated example of FIG. 5, at block 508, the first prediction selection circuitry 216a (FIG. 2) selects one of the intra-prediction block or the inter-prediction block based on one or more profit criteria (e.g., based on the amount of bytes required to encode the blocks, based on the quality of the blocks, etc.). At block 510, the example residual generation circuitry 218 (FIG. 2) generates a residual based on the current block in the current frame of video being processed and the predicted block selected by the first prediction selection circuitry 216a. For example, at block 510, the residual generation circuitry 218 determines the differences between (a) the current block in the current frame of video being processed and (b) the predicted block selected by the first prediction selection circuitry 216a.

In the illustrated example of FIG. 5, at block 512, the transform circuitry 220 (FIG. 2) executes a transform algorithm to reduce the residual (e.g., the data that is not predicted). For example, at block 512, the transform circuitry 220 generates a transformed residual by executing a DCT with the residual as an input. At block 514, the example quantization circuitry 222 (FIG. 2) quantizes the transformed residual. For example, at block 514, the quantization circuitry 222 removes insignificant values of the transformed residual (e.g., near zero values of the DCT). In the illustrated example, control advances to both block 516 and block 518 from block 514. At block 516, the example first multi-symbol entropy coding circuitry 224a (FIG. 2) performs multi-symbol entropy encoding. Example instructions that may be used to implement an encoding algorithm to implement block 516 are described below in connection with FIGS. 6 and 7.

In the illustrated example of FIG. 5, at block 518, the first inverse quantization circuitry 226a (FIG. 2) performs inverse quantization to regenerate the transformed residual. At block 520, the example first inverse transform circuitry 228a (FIG. 2) executes an inverse transform algorithm to regenerate the residual. At block 522, the example first frame reconstruction circuitry 230a (FIG. 2) generates a reference frame by combining the prediction selected by the first prediction selection circuitry 216a with the residual received from the first inverse transform circuitry 228a. For example, the first frame reconstruction circuitry 230a implements a decoder picture buffer that stores one or more reference frames that are used by the first inter-prediction circuitry 214a in making inter-predictions. At block 522, the example first frame reconstruction circuitry 230a filters the reference frame via a deblocking filter to improve the quality of the one or more reference frames.

In the illustrated example of FIG. 5, at block 524, at least one of the first intra-prediction circuitry 212a or the first inter-prediction circuitry 214a determines whether there is an additional input frame. In response to at least one of the first intra-prediction circuitry 212a or the first inter-prediction circuitry 214a determining that there is an additional input frame (block 524: YES), the machine-readable instructions and/or the operations 500 return to block 502. In response to at least one of the first intra-prediction circuitry 212a or the first inter-prediction circuitry 214a determining that there is not an additional input frame (block 524: NO), the machine-readable instructions and/or the operations 500 terminate.

FIG. 6 is a flowchart representative of example machine-readable instructions and/or example operations 516 that may be executed and/or instantiated by example processor circuitry to implement the multi-symbol entropy coding circuitry 224 of FIGS. 2 and/or 3 to perform multi-symbol entropy encoding for prime numbered alphabets. The machine-readable instructions and/or the operations 516 of FIG. 6 begin at block 602, at which the example equiprobable bypass control circuitry 302 (FIG. 3) determines whether an equiprobable bypass mode is available to encode the current block being processed. In response to the equiprobable bypass control circuitry 302 determining that an equiprobable bypass mode is not available to encode the current block being processed (block 602: NO), the example machine-readable instructions and/or the operations 516 proceed to block 604. At block 604, the example entropy coding circuitry 304 (FIG. 3) performs standard multi-symbol entropy encoding according to the video coding format (e.g., AV1, Daala, CABAC, etc.). For example, the example entropy coding circuitry 304 may use any suitable prior (e.g., standard) technique to perform the multi-symbol entropy coding at block 604. After block 604, the example machine-readable instructions and/or the operations 516 return to the machine-readable instructions and/or operations 500 at block 524.

In the example of FIG. 6, in response to the equiprobable bypass control circuitry 302 determining that an equiprobable bypass mode is available to encode the current block being processed (block 602: YES), the machine-readable instructions and/or the operations 516 proceed to block 606. At block 606, the example equiprobable bypass control circuitry 302 initializes an upper limit (R) to an upper value (RNG) and a lower limit (L) to a lower value (LOW). At block 608, the example equiprobable bypass control circuitry 302 determines an alphabet size (N). At block 609, the example equiprobable bypass control circuitry 302 determines an approximate value (RN) approximating a product of (1) a quotient of (a) a difference between the alphabet size (N) and one and (b) the alphabet size (N) and (2) the upper limit (R)

$$\left(e.g., RN = \frac{N-1}{N} * R\right).$$

At block 610, the example equiprobable bypass control circuitry 302 determines whether an input symbol to be encoded is greater than a reference value (e.g., VAL>0).

In the illustrated example of FIG. 6, in response to the equiprobable bypass control circuitry 302 determining that the input symbol to be encoded is greater than a reference value (block 610: YES), the machine-readable instructions and/or the operations 516 proceed to block 612. In response to the equiprobable bypass control circuitry 302 determining that the input symbol to be encoded is not greater than a reference value (block 610: NO), the example machine-readable instructions and/or the operations 516 proceed to block 614. At block 612, the example interval control circuitry 306 (FIG. 3) sets the lower limit equal to a sum of (a) a current value of the lower limit and (b) a difference between a current value of the upper limit and the approximate value (e.g., L=L+R−RN). At block 616, the example interval control circuitry 306 sets the upper limit equal to the approximate value.

In the illustrated example of FIG. 6, at block 614, the example interval control circuitry 306 sets the upper limit equal to a difference between a current value of the upper limit and the approximate value (e.g., R=R−RN). At block 618, the example renormalization circuitry 308 (FIG. 3) renormalizes the upper limit (R) and the lower limit (L). For example, at block 618, the renormalization circuitry 308 shifts the upper limit and/or the lower limit by a respective number of bits. At block 620, the example equiprobable bypass control circuitry 302 determines whether an input symbol to be encoded is greater than a reference value (e.g., VAL>0).

In the illustrated example of FIG. 6, in response to the equiprobable bypass control circuitry 302 determining that the input symbol to be encoded is greater than a reference value (block 620: YES), the machine-readable instructions and/or the operations 516 proceed to block 622. At block 622, the example equiprobable entropy coding circuitry 310 (FIG. 3) performs binary equiprobable entropy coding of one less than the value of the input symbol. In response to the equiprobable bypass control circuitry 302 determining that the input symbol to be encoded is not greater than a reference value (block 620: NO), the example machine-readable instructions and/or the operations 516 proceed to block 624. At block 624, the example interval control circuitry 306 increments the lower value (e.g., LOW=LOW+1). At block 626, the example interval control circuitry 306 sets the upper value equal to the approximate value (e.g., RNG=RN). After block 626, the example machine-readable instructions and/or the operations 516 return to the machine-readable instructions and/or operations 500 at block 524 of FIG. 5.

Figure 7:
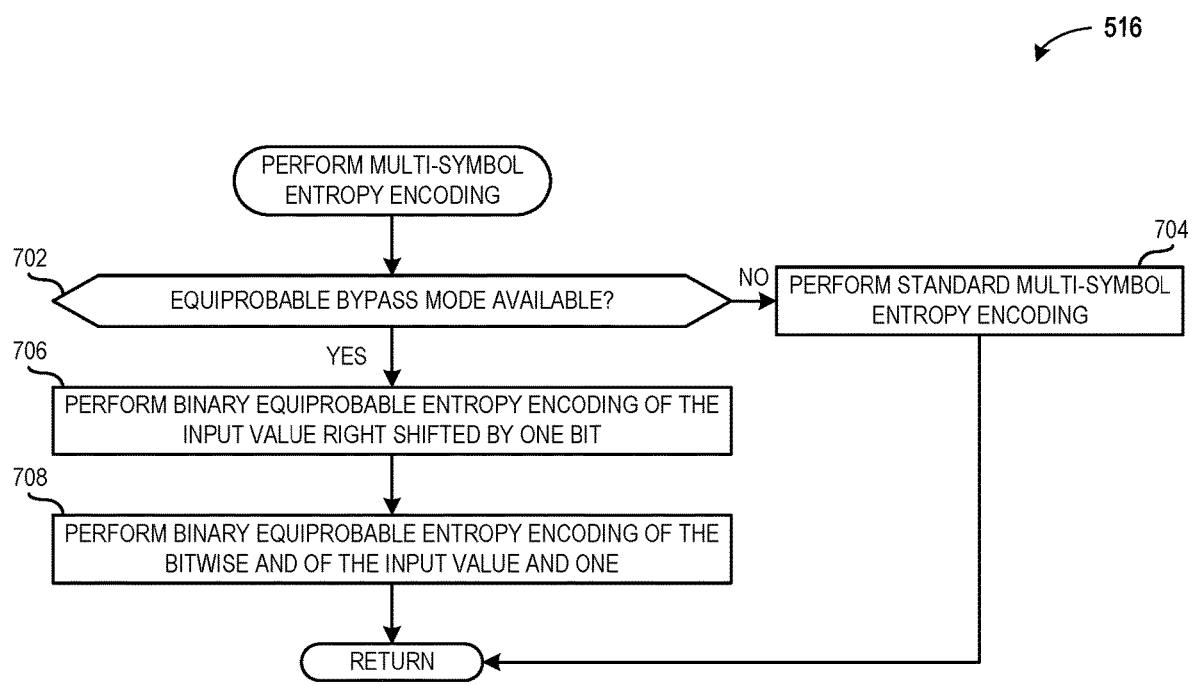
FIG. 7 is a flowchart representative of example machine-readable instructions and/or example operations that may be executed and/or instantiated by example processor circuitry to implement the multi-symbol entropy coding circuitry of FIGS. 2 and/or 3 to perform multi-symbol entropy encoding for non-prime numbered alphabets.

FIG. 7 is a flowchart representative of example machine-readable instructions and/or example operations 516 that may be executed and/or instantiated by example processor circuitry to implement the multi-symbol entropy coding circuitry 224 of FIGS. 2 and/or 3 to perform multi-symbol entropy encoding for non-prime numbered alphabets. The machine-readable instructions and/or example operations 516 begin at block 702 where the example equiprobable bypass control circuitry 302 (FIG. 3) determines whether an equiprobable bypass mode is available to encode the current block being processed. In response to the equiprobable bypass control circuitry 302 determining that equiprobable bypass mode is not available to encode the current block being processed (block 702: NO), the example machine-readable instructions and/or the operations 516 proceed to block 704. At block 704, the example entropy coding circuitry 304 (FIG. 3) performs standard multi-symbol entropy encoding according to the video coding format (e.g., AV1, Daala, CABAC, etc.). For example, the example entropy coding circuitry 304 may use any suitable prior (e.g., standard) technique to perform the multi-symbol entropy coding at block 704. After block 704, the machine-readable instructions and/or the operations 516 return to the machine-readable instructions and/or operations 500 at block 524.

In the example of FIG. 7, in response to the equiprobable bypass control circuitry 302 determining that the equiprobable bypass mode is available to encode the current block being processed (block 702: YES), the machine-readable instructions and/or the operations 516 proceed to block 706. At block 706, the example equiprobable entropy coding circuitry 310 performs binary equiprobable entropy encoding of the input symbol value right shifted by one bit (e.g., VAL>>1). At block 708, the equiprobable entropy coding circuitry 310 (FIG. 3) performs binary equiprobable entropy encoding of the bitwise AND of the input value and one (e.g., VAL & 1). After block 708, the machine-readable instructions and/or the operations 516 return to the machine-readable instructions and/or operations 500 at block 524 of FIG. 5.

FIG. 8 is a flowchart representative of example machine-readable instructions and/or example operations 800 that may be executed and/or instantiated by example processor circuitry to implement the decoding system 204 of FIG. 2 to perform decoding. The machine-readable instructions and/or example operations 800 begin at block 802 where the example second multi-symbol entropy coding circuitry 224b (FIG. 2) performs multi-symbol entropy decoding. Example instructions that may be used to implement a decoding algorithm to implement block 802 are described below in connection with FIGS. 9 and 10. At block 804, the example second intra-prediction circuitry 212b (FIG. 2) receives a decoded block and searches for another block within the current frame that can be copied or that is the same or substantially the same as the current block (e.g., an intra-prediction).

In the illustrated example of FIG. 8, at block 806, the second inter-prediction circuitry 214b (FIG. 2) receives a block in the current frame of video being processed and searches for another block in another frame or other frames that can be copied or that is the same or substantially the same as the current block (e.g., an inter-prediction). At block 808, the example second prediction selection circuitry 216b (FIG. 2) selects one of the intra-prediction block or the inter-prediction block based on one or more profit criteria (e.g., based on the amount of bytes required to decode the blocks, based on the quality of the blocks, etc.). At block 810, the example second inverse quantization circuitry 226b (FIG. 2) generates the transformed residual via inverse quantization.

In the illustrated example of FIG. 8, at block 812, the second inverse transform circuitry 228b (FIG. 2) regenerates the residual via an inverse transform. For example, the second inverse transform circuitry 228b executes an inverse transform algorithm to regenerate the residual. At block 814, the example second frame reconstruction circuitry 230b (FIG. 2) generates an output video frame by combining the prediction selected by the second prediction selection circuitry 216b with the residual received from the second inverse transform circuitry 228b. For example, the second frame reconstruction circuitry 230b filters the output frame via a deblocking filter to improve the quality of the output frame.

In the illustrated example of FIG. 8, at block 816, the second multi-symbol entropy coding circuitry 224b determines whether there is an additional input video frame. In response to the second multi-symbol entropy coding circuitry 224b determining that there is an additional input video frame (block 816: YES), the example machine-readable instructions and/or the operations 800 return to block 802. In response to the second multi-symbol entropy coding circuitry 224b determining that there is not an additional input video frame (block 816: NO), the example machine-readable instructions and/or the operations 800 terminate.

FIG. 9 is a flowchart representative of example machine-readable instructions and/or example operations 802 that may be executed and/or instantiated by example processor circuitry to implement the multi-symbol entropy coding circuitry 224 of FIGS. 2 and/or 3 to perform multi-symbol entropy decoding for prime numbered alphabets. The machine-readable instructions and/or the operations 802 of FIG. 9 begin at block 902, at which the example equiprobable bypass control circuitry 302 (FIG. 3) determines whether an equiprobable bypass mode is available to decode the bitstream. In response to the equiprobable bypass control circuitry 302 determining that an equiprobable bypass mode is not available to decode the bitstream (block 902: NO), the machine-readable instructions and/or the operations 802 proceed to block 904. At block 904, the entropy coding circuitry 304 performs standard multi-symbol entropy decoding according to the video coding format (e.g., AV1, Daala, CABAC, etc.). For example, the example entropy coding circuitry 304 may use any suitable prior (e.g., standard) technique to perform the multi-symbol entropy coding at block 904. After block 904, the machine-readable instructions and/or the operations 802 return to the machine-readable instructions and/or operations 800 at blocks 804, 806, and/or 810 of FIG. 8.

In the example of FIG. 9, in response to the equiprobable bypass control circuitry 302 determining that an equiprobable bypass mode is available to decode the bitstream (block 902: YES), the machine-readable instructions and/or the operations 802 proceed to block 906. At block 906, the example equiprobable bypass control circuitry 302 loads a portion of a received bitstream into the decoding buffer 312. At block 908, the example equiprobable bypass control circuitry 302 initializes an upper limit (R) to an upper value (RNG). At block 910, the example equiprobable bypass control circuitry 302 determines an alphabet size (N). At block 911, the example equiprobable bypass control circuitry 302 determines an approximate value (RN) approximating a product of (1) a quotient of (a) a difference between the alphabet size (N) and one and (b) the alphabet size (N) and (2) the upper limit (R)

$$\left(\text{e.g., } RN = \frac{N-1}{N} * R\right).$$

In the illustrated example of FIG. 9, at block 912, the equiprobable bypass control circuitry 302 sets an intermediate value (VW) equal to the approximate value (RN) left shifted by sixteen bits (e.g., VW=RN<<16). At block 914, the example equiprobable bypass control circuitry 302 determines whether the current portion of the bitstream (DIF) in the decoding buffer 312 (DEC) is greater than or equal to the intermediate value (e.g., DIF>=VW). In response to the equiprobable bypass control circuitry 302 determining that the current portion of the bitstream (DIF) in the decoding buffer 312 (DEC) is greater than or equal to the intermediate value (block 914: YES), the machine-readable instructions and/or the operations 802 proceed to block 916. At block 916, the example interval control circuitry 306 (FIG. 3) sets the portion of the bitstream (DIF) equal to a difference between the current portion of the bitstream (DIF) and the intermediate value (VW) (e.g., DIF=DIF−VW). At block 918, the example interval control circuitry 306 sets a new upper limit (R_NEW) equal to a difference between the current value of the upper limit (R) and the approximate value (RN) (e.g., R_NEW=R−RN). At block 920, the interval control circuitry 306 sets a symbol value (RET) equal to zero.

Returning to block 914, in response to the equiprobable bypass control circuitry 302 determining that the current portion of the bitstream (DIF) in the decoding buffer 312 (DEC) is not greater than or equal to the intermediate value (VW) (block 914: NO), the example machine-readable instructions and/or the operations 802 proceed to block 922. At block 922, the example interval control circuitry 306 sets the new upper limit (R_NEW) equal to the approximate value (RN) (e.g., R_NEW=RN). At block 924, the example interval control circuitry 306 sets the symbol value (RET) equal to one. At block 926, the example renormalization circuitry 308 renormalizes the new upper limit (R_NEW) and the portion of the bitstream (DIF) in the decoding buffer 312 (DEC) (FIG. 3).

In the illustrated example of FIG. 9, at block 928, the equiprobable bypass control circuitry 302 determines whether a decoded symbol value is greater than a reference value (e.g., RET>0). For example, the reference value is zero. In response to the example equiprobable bypass control circuitry 302 determining that a decoded symbol value is greater than a reference value (block 928: YES), the example machine-readable instructions and/or the operations 802 proceed to block 930. In response to the equiprobable bypass control circuitry 302 determining that a decoded symbol value is not greater than a reference value (block 928: NO), the machine-readable instructions and/or the operations 802 proceed to block 932. At block 930, the example equiprobable entropy coding circuitry 310 (FIG. 3) sets the symbol value equal to a sum of the current value of the symbol and the output of binary equiprobable entropy decoding of the portion of the bitstream (DIF) in the decoding buffer 312 (DEC) and the upper limit (R). At block 932, the example equiprobable bypass control circuitry 302 returns the symbol value. After block 932, the example machine-readable instructions and/or the operations 802 return to the machine-readable instructions and/or operations 800 at blocks 804, 806, and/or 810 (FIG. 8).

Figure 10:
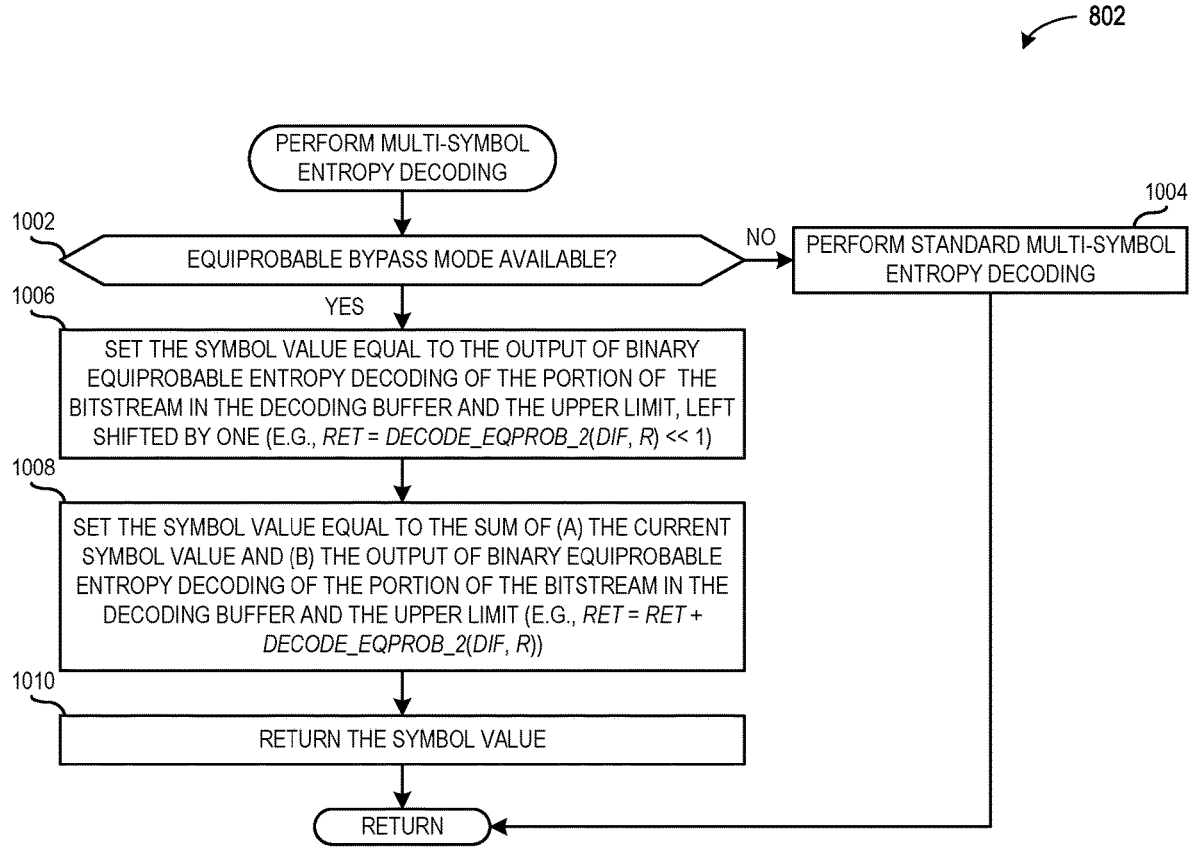
FIG. 10 is a flowchart representative of example machine-readable instructions and/or example operations that may be executed and/or instantiated by example processor circuitry to implement the multi-symbol entropy coding circuitry of FIGS. 2 and/or 3 to perform multi-symbol entropy decoding for non-prime numbered alphabets.

FIG. 10 is a flowchart representative of example machine-readable instructions and/or example operations 1000 that may be executed and/or instantiated by example processor circuitry to implement the multi-symbol entropy coding circuitry 224 of FIGS. 2 and/or 3 to perform multi-symbol entropy decoding for non-prime numbered alphabets. The machine-readable instructions and/or example operations 802 begin at block 1002 where the example equiprobable bypass control circuitry 302 (FIG. 3) determines whether an equiprobable bypass mode is available to decode the bitstream. In response to the equiprobable bypass control circuitry 302 determining that an equiprobable bypass mode is not available to decode the bitstream (block 1002: NO), the example machine-readable instructions and/or the operations 802 proceed to block 1004. At block 1004, the example entropy coding circuitry 304 (FIG. 3) performs standard multi-symbol entropy decoding according to the video coding format (e.g., AV1, Daala, CABAC, etc.). For example, the example entropy coding circuitry 304 may use any suitable prior (e.g., standard) technique to perform the multi-symbol entropy coding at block 1004. After block 1004, the machine-readable instructions and/or the operations 802 return to the machine-readable instructions and/or operations 800 at blocks 804, 806, and/or 810.

In the example of FIG. 10, in response to the equiprobable bypass control circuitry 302 determining that an equiprobable bypass mode is available to decode the bitstream (block 1002: YES), the example machine-readable instructions and/or the operations 802 proceed to block 1006. At block 1006, the example equiprobable entropy coding circuitry 310 (FIG. 3) sets the symbol value (RET) equal to the output of binary equiprobable entropy decoding of the portion of the bitstream (DIF) in the decoding buffer 312 (DEC) and the upper limit (R) left shifted by one (e.g., RET=DECODE_EQPROB_2(DIF, R)<<1). At block 1008, the example equiprobable entropy coding circuitry 310 sets the symbol value (RET) equal to the sum of (a) the current value of the symbol and (b) the output of binary equiprobable entropy decoding of the portion of the bitstream (DIF) in the decoding buffer 312 (DEC) and the upper limit (R) (e.g., RET=RET+DECODE_EQPROB_2(DIF, R)). At block 1010, the example equiprobable bypass control circuitry 302 returns the symbol value. After block 1010, the example machine-readable instructions and/or the operations 802 return to the machine-readable instructions and/or operations 800 at blocks 804, 806, and/or 810 of FIG. 8.

Figure 11A:
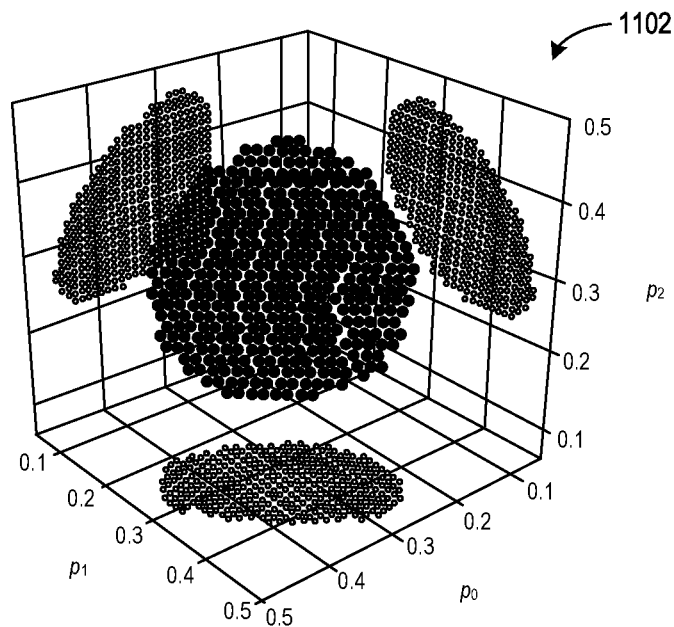
FIG. 11A is a three-dimensional graph showing a region of probabilities where three symbol equiprobable mode entropy coding outperforms conventional exponential smoothing techniques with an alpha value of one-sixteenth.

FIG. 11A is an illustration 1102 of the region of probabilities where three symbol equiprobable mode entropy coding outperforms conventional exponential smoothing techniques with an alpha value of one-sixteenth (1/16). For example, the exponential smoothing technique for AV1 predicts probability with some error. As such, in some cases, even if probabilities of the source are not equal for 1/N, bypass mode outperforms entropy coding with exponential smoothing. In the example of FIG. 11A, the alphabet size is three (e.g., N=3) and the alphabet includes symbols "0", "1", and "2" (e.g., integer values). In FIG. 11A, the probabilities of "0", "1", and "2" are $p_0$, $p_1$, and $p_2$, respectively. As $p_0+p_1+p_2=1$, the possible values of probabilities belong to the planes illustrated in FIG. 11A.

Figure 11B:
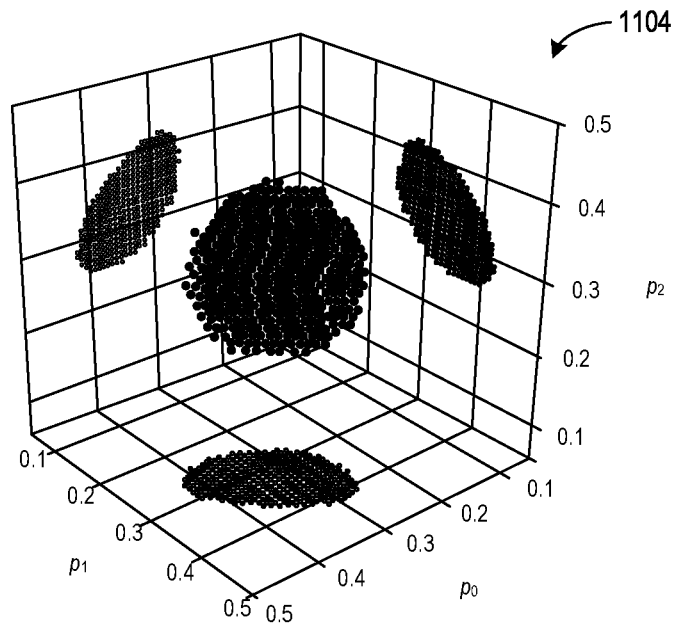
FIG. 11B is a three-dimensional graph showing a region of probabilities where three symbol equiprobable mode entropy coding outperforms conventional exponential smoothing techniques with an alpha value of one-thirty-second.

FIG. 11B is an illustration 1104 of the region of probabilities where three symbol equiprobable mode entropy coding outperforms conventional exponential smoothing techniques with an alpha value of one-thirty-second (1/32). In the example of FIG. 11B, the alphabet size is three (e.g., N=3) and the alphabet includes symbols "0", "1", and "2" (e.g., integer values). In FIG. 11B, the probabilities of "0", "1", and "2" are $p_0$, $p_1$, and $p_2$, respectively. As $p_0+p_1+p_2=1$, the possible values of probabilities belong to the planes illustrated in FIG. 11B.

Figure 12A:
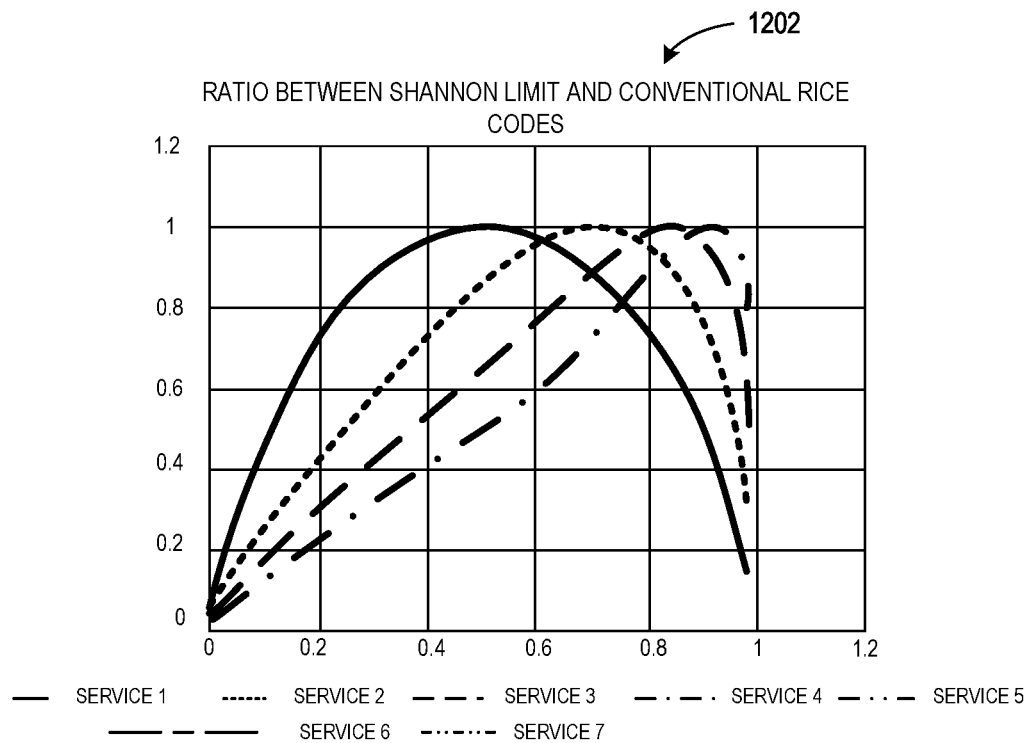
FIG. 12A is an illustration of a graph showing the ratio between the Shannon limit and conventional Rice codes.
Figure 12B:
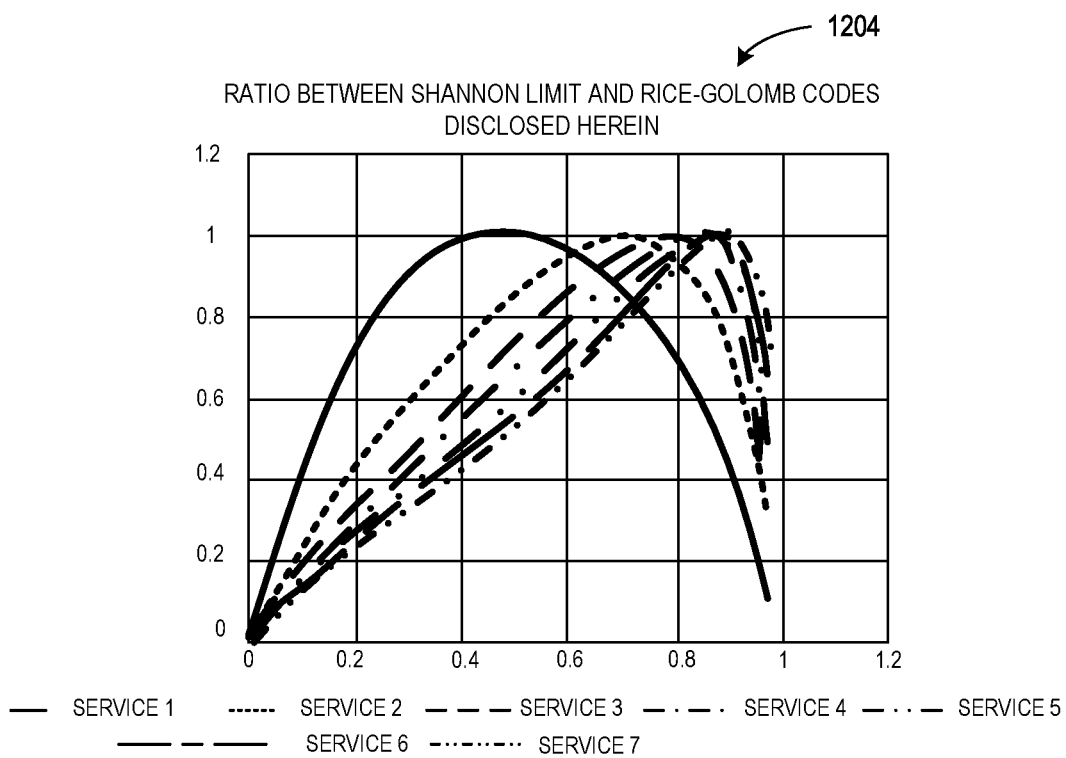
FIG. 12B is an illustration of a graph showing the ratio between the Shannon limit and Rice codes and Golomb codes as disclosed herein.

FIG. 12A is an illustration of a graph 1202 showing the ratio between the Shannon limit and conventional Rice codes. As described above, the result of division of two positive integers, x and M, with remainder is illustrated in equation 5. In equation 5, M is a divisor, q is a quotient, and r is a remainder. If the divisor, M, is the power of two ($M=2^k$), then using unary codes for M and usual k-bits binary representation for r (e.g., $r<2^k$), Rice codes are obtained. However, if M is not a power of two, examples disclosed herein can be applied instead of binary representation. Conventional Rice codes are very effective for data with geometric distribution. For example, for some values of parameters, Rice codes are very close to the Shannon limit. Examples disclosed herein allow video codecs to switch between Rice-Golomb codes more smoothly. Thus, examples disclosed herein improve encoding. FIG. 12B is an illustration of a graph 1204 showing the ratio between the Shannon limit and Rice codes and Golomb codes as disclosed herein.

Figure 13:
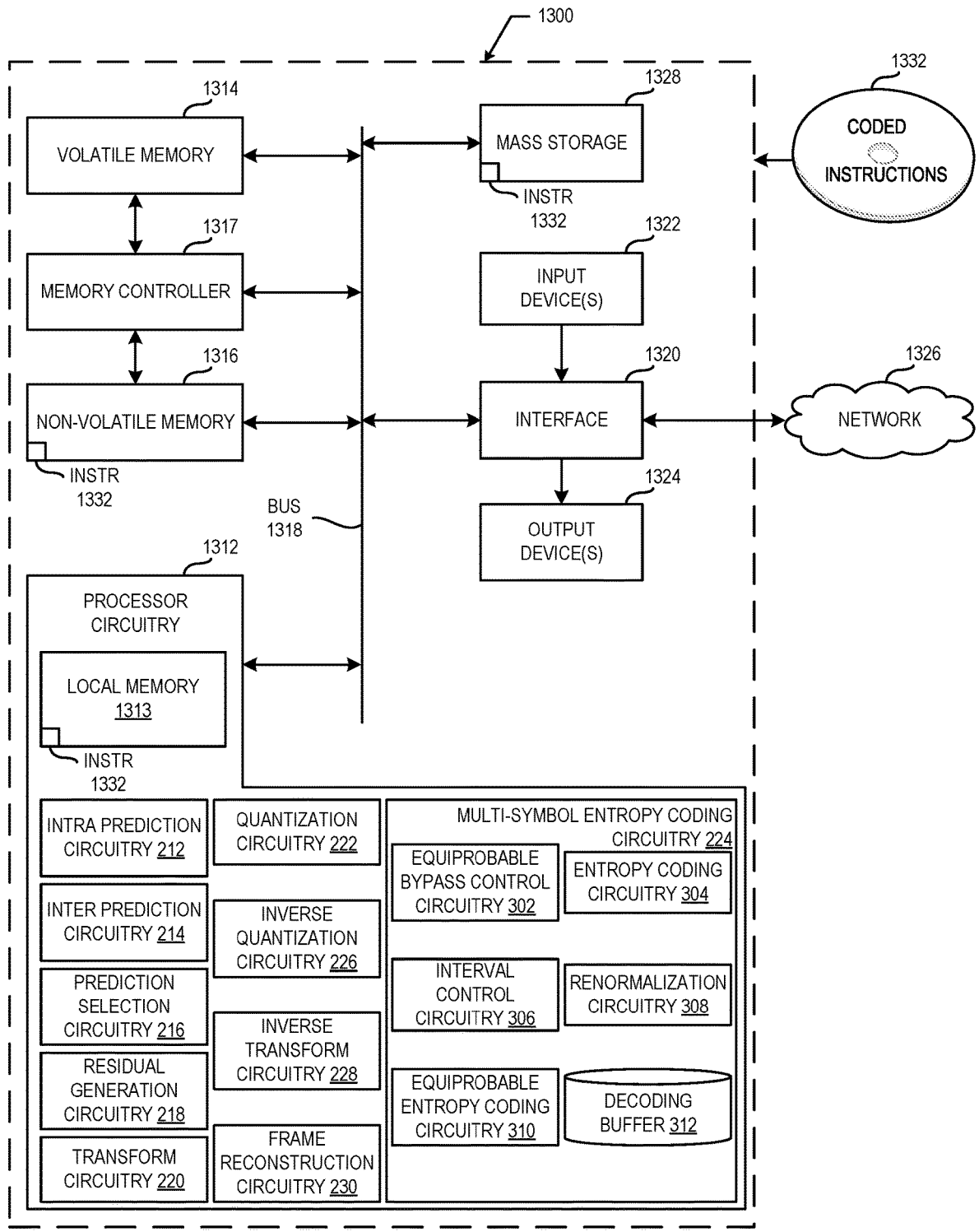
FIG. 13 is a block diagram of an example processing platform including processor circuitry structured to execute and/or instantiate the example machine-readable instructions and/or the example operations of FIGS. 5, 6, 7, 8, 9, and/or 10 to implement a coding system such as the encoding system and/or the decoding system of FIG. 2.

FIG. 13 is a block diagram of an example processor platform 1300 structured to execute and/or instantiate the machine-readable instructions and/or the operations of FIGS. 5, 6, 7, 8, 9, and/or 10 to implement the encoding system 202, the decoding system 204, and/or the multi-symbol entropy coding circuitry 224 of FIGS. 2 and/or 3. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example intra-prediction circuitry 212a, b, the example inter-prediction circuitry 214a, b, the example prediction selection circuitry 216a, b, the example residual generation circuitry 218, the example transform circuitry 220, the example quantization circuitry 222, the example multi-symbol entropy coding circuitry 224a, b, the example inverse quantization circuitry 226a, b, the example inverse transform circuitry 228a, b, and/or the example frame reconstruction circuitry 230a, b and/or the example equiprobable bypass control circuitry 302, the example entropy coding circuitry 304, the example interval control circuitry 306, the example renormalization circuitry 308, the example equiprobable entropy coding circuitry 310, and/or the example decoding buffer 312.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random-Access Memory (SDRAM), Dynamic Random-Access Memory (DRAM), RAMBUS® Dynamic Random-Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1332, which may be implemented by the machine-readable instructions of FIGS. 5, 6, 7, 8, 9, and/or 10, may be stored in the mass storage device 1328, in the volatile memory 1314, in the non-volatile memory 1316, and/or on a removable non-transitory computer readable storage medium such as a CD or DVD.

Figure 14:
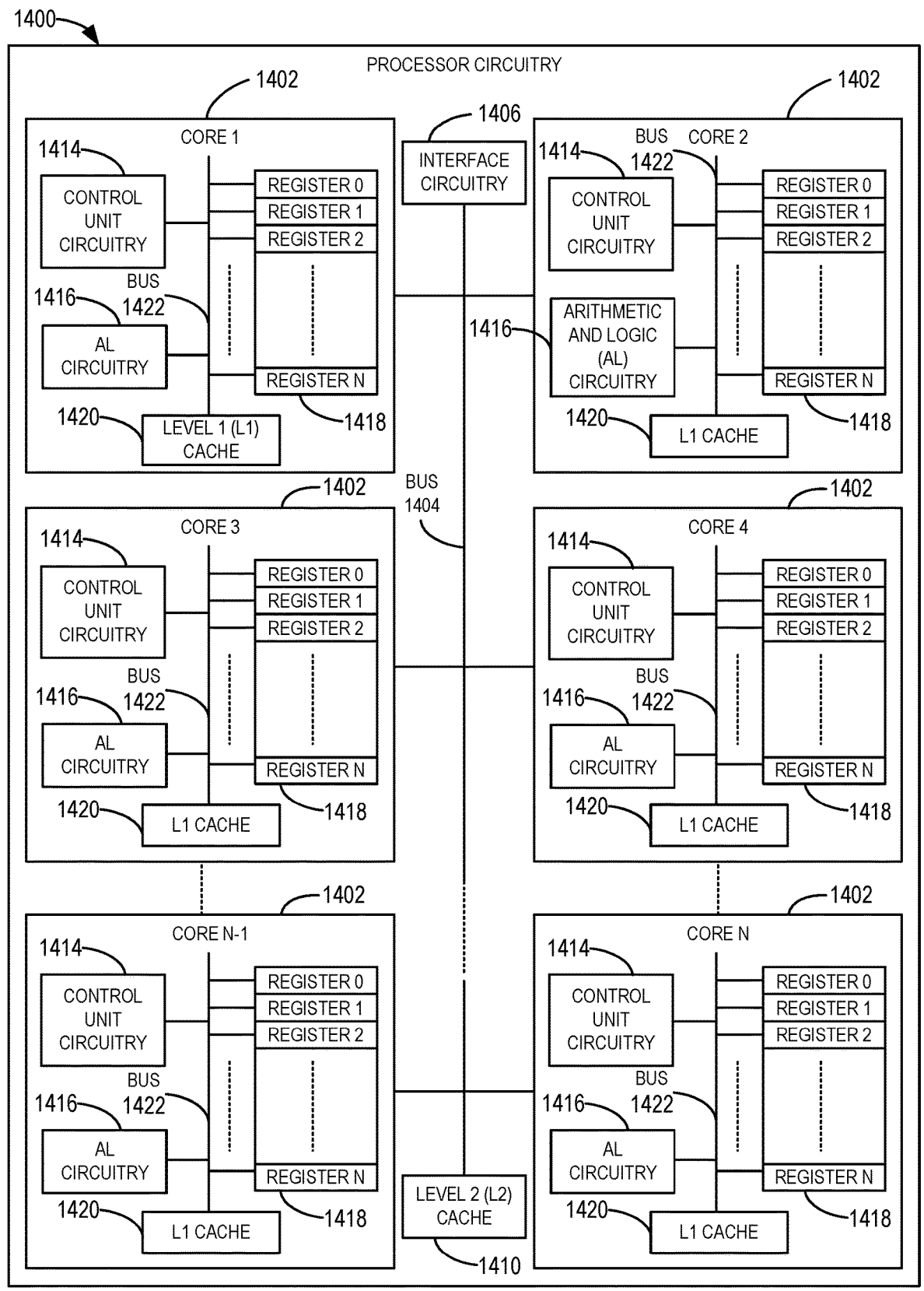
FIG. 14 is a block diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a general-purpose processor circuitry 1400. The general-purpose processor circuitry 1400 executes some or all of the machine-readable instructions of the flowcharts of FIGS. 5, 6, 7, 8, 9, and/or 10 to effectively instantiate the circuitry of FIGS. 2 and/or 3 as logic circuits to perform the operations corresponding to those machine-readable instructions. In some such examples, the circuitry of FIGS. 2 and/or 3 is instantiated by the hardware circuits of the general-purpose processor circuitry 1400 in combination with the instructions. For example, the general-purpose processor circuitry 1400 may implement multi-core hardware circuitry such as a CPU, a DSP, a GPU, an XPU, etc. Although it may include any number of example cores 1402 (e.g., 1 core), the general-purpose processor circuitry 1400 of this example is a multi-core semiconductor device including N cores. The cores 1402 of the general-purpose processor circuitry 1400 may operate independently or may cooperate to execute machine-readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine-readable instructions and/or operations represented by the flowcharts of FIGS. 5, 6, 7, 8, 9, and/or 10.

The cores 1402 may communicate by a first example bus 1404. In some examples, the first bus 1404 may implement a communication bus to effectuate communication associated with one(s) of the cores 1402. For example, the first bus 1404 may implement at least one of an Inter-Integrated Circuit (I2C) bus, a Serial Peripheral Interface (SPI) bus, a PCI bus, or a PCIe bus. Additionally or alternatively, the first bus 1404 may implement any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the general-purpose processor circuitry 1400 also includes example shared memory 1410 that may be shared by the cores (e.g., Level 2 (L2_cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry 1416 (sometimes referred to as an ALU and/or arithmetic and logic circuitry), a plurality of registers 1418, the L1 cache 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control data movement (e.g., coordinate data movement) within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general-purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may implement at least one of an I2C bus, a SPI bus, a PCI bus, or a PCIe bus.

Each core 1402 and/or, more generally, the general-purpose processor circuitry 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The general-purpose processor circuitry 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
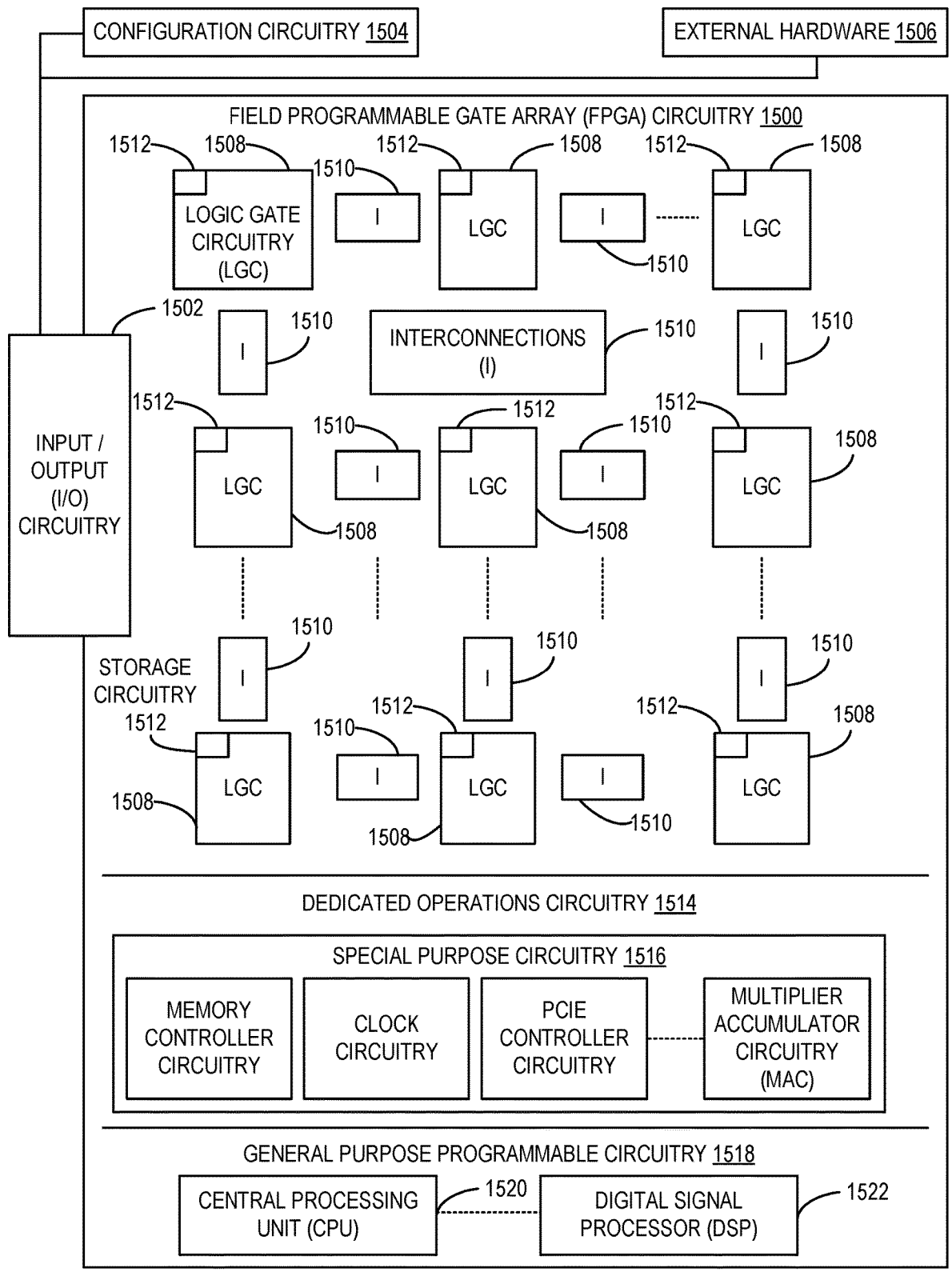
FIG. 15 is a block diagram of another example implementation of the processor circuitry of FIG. 13.

FIG. 15 is a block diagram of another example implementation of the processor circuitry 1312 of FIG. 13. In this example, the processor circuitry 1312 is implemented by FPGA circuitry 1500. The FPGA circuitry 1500 can be used, for example, to perform operations that could otherwise be performed by the example general-purpose processor circuitry 1400 of FIG. 14 executing corresponding machine-readable instructions. However, once configured, the FPGA circuitry 1500 instantiates the machine-readable instructions in hardware and, thus, can often execute the operations faster than they could be performed by a general-purpose microprocessor executing the corresponding software.

More specifically, in contrast to the general-purpose processor circuitry 1400 of FIG. 14 described above (which is a general-purpose device that may be programmed to execute some or all of the machine-readable instructions represented by the flowcharts of FIGS. 5, 6, 7, 8, 9, and/or 10 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine-readable instructions represented by the flowcharts of FIGS. 5, 6, 7, 8, 9, and/or 10. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 5, 6, 7, 8, 9, and/or 10. As such, the FPGA circuitry 1500 may be structured to effectively instantiate some or all of the machine-readable instructions of the flowcharts of FIGS. 5, 6, 7, 8, 9, and/or 10 as dedicated logic circuits to perform the operations corresponding to those software instructions in a dedicated manner analogous to an ASIC. Therefore, the FPGA circuitry 1500 may perform the operations corresponding to the some or all of the machine-readable instructions of FIGS. 5, 6, 7, 8, 9, and/or 10 faster than the general-purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware (e.g., external hardware circuitry) 1506. For example, the configuration circuitry 1504 may implement interface circuitry that may obtain machine-readable instructions to configure the FPGA circuitry 1500, or portion(s) thereof. In some such examples, the configuration circuitry 1504 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may implement the general-purpose processor circuitry 1400 of FIG. 14. The FPGA circuitry 1500 also includes an array of example logic gate circuitry 1508, a plurality of example configurable interconnections 1510, and example storage circuitry 1512. The logic gate circuitry 1508 and interconnections 1510 are configurable to instantiate one or more operations that may correspond to at least some of the machine-readable instructions of FIGS. 5, 6, 7, 8, 9, and/or 10 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special-purpose circuitry 1516 that may be invoked to implement commonly used functions to avoid the need to program those functions in the field. Examples of such special-purpose circuitry 1516 include memory (e.g., DRAM) controller circuitry, PCIe controller circuitry, clock circuitry, transceiver circuitry, memory, and multiplier-accumulator circuitry. Other types of special-purpose circuitry may be present. In some examples, the FPGA circuitry 1500 may also include example general-purpose programmable circuitry 1518 such as an example CPU 1520 and/or an example DSP 1522. Other general-purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern FPGA circuitry may include an on-board CPU, such as one or more of the example CPU 1520 of FIG. 15. Therefore, the processor circuitry 1312 of FIG. 13 may additionally be implemented by combining the example general-purpose processor circuitry 1400 of FIG. 14 and the example FPGA circuitry 1500 of FIG. 15. In some such hybrid examples, a first portion of the machine-readable instructions represented by the flowcharts of FIGS. 5, 6, 7, 8, 9, and/or 10 may be executed by one or more of the cores 1402 of FIG. 14, a second portion of the machine-readable instructions represented by the flowcharts of FIGS. 5, 6, 7, 8, 9, and/or 10 may be executed by the FPGA circuitry 1500 of FIG. 15, and/or a third portion of the machine-readable instructions represented by the flowcharts of FIGS. 5, 6, 7, 8, 9, and/or 10 may be executed by an ASIC. It should be understood that some or all of the circuitry of FIGS. 2 and/or 3 may, thus, be instantiated at the same or different times. Some or all of the circuitry may be instantiated, for example, in one or more threads executing concurrently and/or in series. Moreover, in some examples, some or all of the circuitry of FIGS. 2 and/or 3 may be implemented within one or more virtual machines and/or containers executing on the microprocessor.

In some examples, the processor circuitry 1312 of FIG. 13 may be in one or more packages. For example, the general-purpose processor circuitry 1400 of FIG. 14 and/or the FPGA circuitry 1500 of FIG. 15 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

Figure 16:
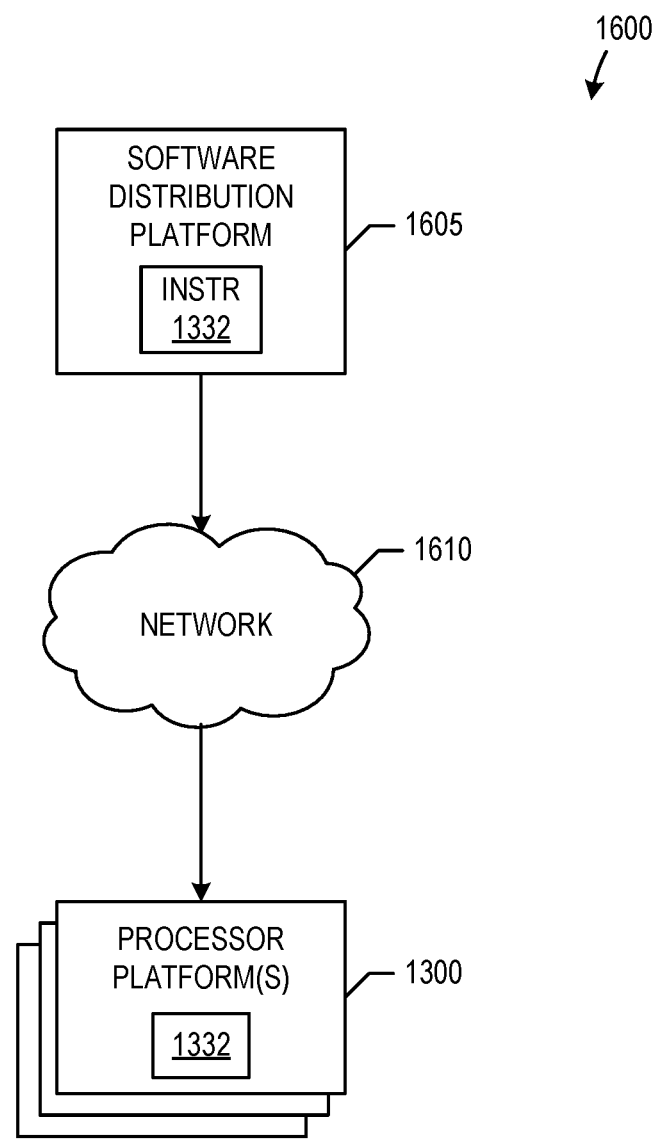
FIG. 16 is a block diagram of an example software distribution platform (e.g., one or more servers) to distribute software (e.g., software corresponding to the example machine-readable instructions of FIGS. 5, 6, 7, 8, 9, and/or 10 to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine-readable instructions 1332 of FIG. 13 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine-readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine-readable instructions 1332, which may correspond to the example machine-readable instructions and/or operations 500 of FIG. 5, the example machine-readable instructions and/or operations 516 of FIG. 6, the example machine-readable instructions and/or operations 516 of FIG. 7, the example machine-readable instructions and/or operations 800 of FIG. 8, the example machine-readable instructions and/or operations 802 of FIG. 9, and/or the example machine-readable instructions and/or operations 802 of FIG. 10, as described above. The one or more servers of the example software distribution platform 1605 are in communication with a network 1610, which may correspond to any one or more of the Internet and/or the example network 206 described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1332 from the software distribution platform 1605. For example, the software, which may correspond to the example machine-readable instructions and/or operations 500 of FIG. 5, the example machine-readable instructions and/or operations 516 of FIG. 6, the example machine-readable instructions and/or operations 516 of FIG. 7, the example machine-readable instructions and/or operations 800 of FIG. 8, the example machine-readable instructions and/or operations 802 of FIG. 9, and/or the example machine-readable instructions and/or operations 802 of FIG. 10, may be downloaded to the example processor platform 1300, which is to execute and/or instantiate the machine-readable instructions 1332 to implement the encoding system 202, the decoding system 204, and/or the multi-symbol entropy coding circuitry 224. In some example, one or more servers of the software distribution platform 1605 periodically offer, transmit, and/or force updates to the software (e.g., the example machine-readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed to perform multi-symbol equiprobable mode entropy coding. Example systems, methods, apparatus, and articles of manufacture disclosed herein include a simpler and faster multi-symbol equiprobable mode that may be used to substitute multi-symbol entropy coding in video coding formats such as AV1. Examples disclosed herein may be applied in situations such as when the number of updates inside a context model is too small (e.g., below a threshold value) and/or when probability estimation is not converged to expected (e.g., optimal) values. Examples disclosed herein can be applied when a-priori known probabilities are limited to 1/N. Examples disclosed herein may be applied to encode and/or decode transform coefficients (e.g., Golomb codes for arithmetic coding). Examples disclosed herein can be applied when a real number of context bins is too large (e.g., greater than a threshold). For example, in such a case, the video codec can change the context bins to bypass bins.

Examples disclosed herein may additionally be applied to alleviate restrictions in alphabet sizes. For example, there are many instances when the size of the alphabet relates to $2^n$. For example, in H.264, the number of intra-prediction modes is nine. If one bin for the predicted mode is not matched the alphabet size now equals eight or two to the third (e.g., $8=2^3$) bits for the rest of the possible modes. In H.265, the number of intra-prediction modes is 35. If the three most probable modes are not chosen, the last 32 modes can be covered by five bits. A number of motion vector candidates in HEVC for advanced motion vector prediction (AMVP) and merge modes are also related to $2^n$. An example N-symbol equiprobable mode disclosed herein is a simple (e.g., computationally less intensive) way to enlarge the number of modes for any dictionary or alphabet. Additionally, examples disclosed herein are very useful if the real state of a context model is unknown. For example, such situations are very common on the encoder side. For the majority of hardware encoders, using a-priori known probability is more efficient.

Systems, methods, apparatus, and articles of manufacture disclosed herein enable a bypass mode for multi-symbol entropy coding. Enabling use of a bypass mode reduces entropy decoding complexity, enabling higher performance decoding, without a significant impact on overall coding efficiency. Entropy decoding is a bottleneck in video decoder implementations, especially at high bit-rate operating points. Examples disclosed herein may be implemented in media codecs to increase coding efficiency for video encoder and decoder products. Examples disclosed herein can be applied in any coding scheme where Rice-Golomb codes are used. Examples of video decoding disclosed herein include processing of overhead reading to increase throughput reduce complexity and memory usage.

Disclosed systems, methods, apparatus, and articles of manufacture improve the efficiency of using a computing device by providing for multiplication-free interval subdivision. Additionally, examples disclosed herein improve the efficiency of using a computing device by eliminating the additional memory used to store probability and the total number of updates to context models (e.g., by reducing memory consumption). Examples disclosed herein also reduce the computational complexity of entropy encoding by eliminating updates to probability values. Examples disclosed herein additionally reduce the computational complexity of entropy encoding by eliminating operations executed to maintain an interval greater than zero (e.g., Interval>0). Examples disclosed herein additionally include parallel writing and/or reading several equiprobable symbols. Examples disclosed herein additionally eliminate initialization procedures. Examples disclosed herein output bits that are very close to Hartley entropy which is useful for encoders. Examples disclosed herein additionally improve Rice code compression ratios. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for multi-symbol equiprobable mode entropy coding are disclosed herein. Further examples and combinations thereof include the following:

Example 1 includes an apparatus to implement multi-symbol equiprobable mode entropy coding, the apparatus comprising interface circuitry to obtain one or more blocks of a frame of video to be encoded according to a video coding format having an alphabet with an alphabet size, and processor circuitry including one or more of at least one of a central processor unit (CPU), a graphics processor unit (GPU), or a digital signal processor (DSP), the at least one of the CPU, the GPU, or the DSP having control circuitry to control data movement within the processor circuitry, arithmetic and logic circuitry to perform one or more first operations corresponding to instructions, and one or more registers to store a first result of the one or more first operations, the instructions in the apparatus, a Field Programmable Gate Array (FPGA) circuitry, the FPGA circuitry including first logic gate circuitry, a plurality of configurable interconnections, and storage circuitry, the first logic gate circuitry and interconnections to perform one or more second operations, the storage circuitry to store a second result of the one or more second operations, or Application Specific Integrated Circuitry (ASIC) including second logic gate circuitry to perform one or more third operations, the processor circuitry to perform at least one of the first operations, the second operations, or the third operations to instantiate equiprobable bypass control circuitry to determine whether an input value associated with the one or more blocks is greater than a reference value, and interval control circuitry to, based on the determination, adjust at least one of an upper limit or a lower limit based on an approximate value approximating a product of (1) a quotient of (a) a difference between the alphabet size and one and (b) the alphabet size and (2) the upper limit, the upper limit and the lower limit forming a range of values within which the input value is to be encoded.

Example 2 includes the apparatus of example 1, wherein the reference value is equal to zero.

Example 3 includes the apparatus of any of examples 1 or 2, wherein the processor circuitry is to perform at least one of the first operations, the second operations, or the third operations to instantiate the interval control circuitry to, in response to the determination being that the input value is greater than the reference value set the lower limit equal to a sum of (A) a current value of the lower limit and (B) a difference between a current value of the upper limit and the approximate value, and set the upper limit equal to the approximate value.

Example 4 includes the apparatus of any of examples 1, 2, or 3, wherein the processor circuitry is to perform at least one of the first operations, the second operations, or the third operations to instantiate the interval control circuitry to, in response to the determination being that the input value is not greater than the reference value, set the upper limit equal to a difference between a current value of the upper limit and the approximate value.

Example 5 includes the apparatus of any of examples 1, 2, 3, or 4, wherein the approximate value is derived without a division operation.

Example 6 includes the apparatus of any of examples 1, 2, 3, 4, or 5, wherein the input value includes a fractional Rice parameter.

Example 7 includes the apparatus of any of examples 1, 2, 3, 4, 5, or 6, wherein the alphabet size is not limited to powers of two and is equal to an integer value.

Example 8 includes a non-transitory computer readable medium comprising machine-readable instructions which, when executed, cause processor circuitry to determine whether an input value is greater than a reference value, the input value associated with one or more blocks of a frame of video to be encoded according to a video coding format having an alphabet with an alphabet size, and based on the determination, adjust at least one of an upper limit or a lower limit based on an approximate value approximating a product of (1) a quotient of (a) a difference between the alphabet size and one and (b) the alphabet size and (2) the upper limit, the upper limit and the lower limit forming a range of values within which the input value is to be encoded.

Example 9 includes the non-transitory computer readable medium of example 8, wherein the reference value is equal to zero.

Example 10 includes the non-transitory computer readable medium of any of examples 8 or 9, wherein the machine-readable instructions, when executed, cause the processor circuitry to, in response to the determination being that the input value is greater than the reference value set the lower limit equal to a sum of (A) a current value of the lower limit and (B) a difference between a current value of the upper limit and the approximate value, and set the upper limit equal to the approximate value.

Example 11 includes the non-transitory computer readable medium of any of examples 8, 9, or 10, wherein the machine-readable instructions, when executed, cause the processor circuitry to, in response to the determination being that the input value is not greater than the reference value, set the upper limit equal to a difference between a current value of the upper limit and the approximate value.

Example 12 includes the non-transitory computer readable medium of any of examples 8, 9, 10, or 11, wherein the machine-readable instructions, when executed, cause the processor circuitry to derive the approximate value without a division operation.

Example 13 includes the non-transitory computer readable medium of any of examples 8, 9, 10, 11, or 12, wherein the input value includes a fractional Rice parameter.

Example 14 includes the non-transitory computer readable medium of any of examples 8, 9, 10, 11, 12, or 13, wherein the alphabet size is not limited to powers of two and is equal to an integer value.

Example 15 includes a method to implement multi-symbol equiprobable mode entropy coding, the method comprising determining whether an input value is greater than a reference value, the input value associated with one or more blocks of a frame of video to be encoded according to a video coding format having an alphabet with an alphabet size, and based on the determination, adjusting at least one of an upper limit or a lower limit based on an approximate value approximating a product of (1) a quotient of (a) a difference between the alphabet size and one and (b) the alphabet size and (2) the upper limit, the upper limit and the lower limit forming a range of values within which the input value is to be encoded.

Example 16 includes the method of example 15, wherein the reference value is equal to zero.

Example 17 includes the method of any of examples 15 or 16, further including, in response to the determination being that the input value is greater than the reference value setting the lower limit equal to a sum of (A) a current value of the lower limit and (B) a difference between a current value of the upper limit and the approximate value, and setting the upper limit equal to the approximate value.

Example 18 includes the method of any of examples 15, 16, or 17, further including, in response to the determination being that the input value is not greater than the reference value, setting the upper limit equal to a difference between a current value of the upper limit and the approximate value.

Example 19 includes the method of any of examples 15, 16, 17, or 18, further including deriving the approximate value without a division operation.

Example 20 includes the method of any of examples 15, 16, 17, 18, or 19, wherein the input value includes a fractional Rice parameter.

Example 21 includes the method of any of examples 15, 16, 17, 18, 19, or 20, wherein the alphabet size is not limited to powers of two and is equal to an integer value.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to implement multi-symbol equiprobable mode entropy coding, the apparatus comprising:
   interface circuitry to obtain one or more blocks of a frame of video to be encoded according to a video coding format having an alphabet with an alphabet size; and
   processor circuitry including one or more of:
      at least one of a central processor unit (CPU), a graphics processor unit (GPU), or a digital signal processor (DSP), the at least one of the CPU, the GPU, or the DSP having control circuitry to control data movement within the processor circuitry, arithmetic and logic circuitry to perform one or more first operations corresponding to instructions, and one or more registers to store a first result of the one or more first operations, the instructions in the apparatus;
      a Field Programmable Gate Array (FPGA) circuitry, the FPGA circuitry including first logic gate circuitry, a plurality of configurable interconnections, and storage circuitry, the first logic gate circuitry and interconnections to perform one or more second operations, the storage circuitry to store a second result of the one or more second operations; or
      Application Specific Integrated Circuitry (ASIC) including second logic gate circuitry to perform one or more third operations;
   the processor circuitry to perform at least one of the first operations, the second operations, or the third operations to instantiate:
      equiprobable bypass control circuitry to determine whether an input value associated with the one or more blocks is greater than a reference value; and
      interval control circuitry to, based on the determination, adjust at least one of an upper limit or a lower limit based on an approximate value approximating a product of (1) a quotient of (a) a difference between the alphabet size and one and (b) the alphabet size and (2) the upper limit, the upper limit and the lower limit forming a range of values within which the input value is to be encoded.

2. The apparatus of claim 1, wherein the reference value is equal to zero.

3. The apparatus of claim 1, wherein the processor circuitry is to perform at least one of the first operations, the second operations, or the third operations to instantiate the interval control circuitry to, in response to the determination being that the input value is greater than the reference value:
   set the lower limit equal to a sum of (A) a current value of the lower limit and (B) a difference between a current value of the upper limit and the approximate value; and
   set the upper limit equal to the approximate value.

4. The apparatus of claim 1, wherein the processor circuitry is to perform at least one of the first operations, the second operations, or the third operations to instantiate the interval control circuitry to, in response to the determination being that the input value is not greater than the reference value, set the upper limit equal to a difference between a current value of the upper limit and the approximate value.

5. The apparatus of claim 1, wherein the approximate value is derived without a division operation.

6. The apparatus of claim 1, wherein the input value includes a fractional Rice parameter.

7. The apparatus of claim 1, wherein the alphabet size is not limited to powers of two and is equal to an integer value.

8. A non-transitory computer readable medium comprising machine-readable instructions which, when executed, cause processor circuitry to:
   determine whether an input value is greater than a reference value, the input value associated with one or more blocks of a frame of video to be encoded according to a video coding format having an alphabet with an alphabet size; and
   based on the determination, adjust at least one of an upper limit or a lower limit based on an approximate value approximating a product of (1) a quotient of (a) a difference between the alphabet size and one and (b) the alphabet size and (2) the upper limit, the upper limit and the lower limit forming a range of values within which the input value is to be encoded.

9. The non-transitory computer readable medium of claim 8, wherein the reference value is equal to zero.

10. The non-transitory computer readable medium of claim 8, wherein the machine-readable instructions, when executed, cause the processor circuitry to, in response to the determination being that the input value is greater than the reference value:
   set the lower limit equal to a sum of (A) a current value of the lower limit and (B) a difference between a current value of the upper limit and the approximate value; and
   set the upper limit equal to the approximate value.

11. The non-transitory computer readable medium of claim 8, wherein the machine-readable instructions, when executed, cause the processor circuitry to, in response to the determination being that the input value is not greater than the reference value, set the upper limit equal to a difference between a current value of the upper limit and the approximate value.

12. The non-transitory computer readable medium of claim 8, wherein the machine-readable instructions, when executed, cause the processor circuitry to derive the approximate value without a division operation.

13. The non-transitory computer readable medium of claim 8, wherein the input value includes a fractional Rice parameter.

14. The non-transitory computer readable medium of claim 8, wherein the alphabet size is not limited to powers of two and is equal to an integer value.

15. A method to implement multi-symbol equiprobable mode entropy coding, the method comprising:
   determining whether an input value is greater than a reference value, the input value associated with one or more blocks of a frame of video to be encoded according to a video coding format having an alphabet with an alphabet size; and
   based on the determination, adjusting at least one of an upper limit or a lower limit based on an approximate value approximating a product of (1) a quotient of (a)

a difference between the alphabet size and one and (b) the alphabet size and (2) the upper limit, the upper limit and the lower limit forming a range of values within which the input value is to be encoded.

16. The method of claim 15, wherein the reference value is equal to zero.

17. The method of claim 15, further including, in response to the determination being that the input value is greater than the reference value:
    setting the lower limit equal to a sum of (A) a current value of the lower limit and (B) a difference between a current value of the upper limit and the approximate value; and
    setting the upper limit equal to the approximate value.

18. The method of claim 15, further including, in response to the determination being that the input value is not greater than the reference value, setting the upper limit equal to a difference between a current value of the upper limit and the approximate value.

19. The method of claim 15, further including deriving the approximate value without a division operation.

20. The method of claim 15, wherein the input value includes a fractional Rice parameter.

21. The method of claim 15, wherein the alphabet size is not limited to powers of two and is equal to an integer value.

* * * * *